United States Patent [19]

Nozaki

[11] Patent Number: 6,128,644
[45] Date of Patent: Oct. 3, 2000

[54] LOAD DISTRIBUTION SYSTEM FOR DISTRIBUTING LOAD AMONG PLURALITY OF SERVERS ON WWW SYSTEM

[75] Inventor: Hideki Nozaki, Kawasaki, Japan

[73] Assignee: Fujitsu Limited, Kawasaki, Japan

[21] Appl. No.: 09/118,935

[22] Filed: Jul. 20, 1998

[30] Foreign Application Priority Data

Mar. 4, 1998 [JP] Japan .................................. 10-051689

[51] Int. Cl.$^7$ .......................... G06F 15/16; G06F 15/173
[52] U.S. Cl. .......................... 709/203; 709/201; 709/223; 709/227; 709/228
[58] Field of Search .................................. 709/203, 223, 709/227, 228, 201

[56] References Cited

U.S. PATENT DOCUMENTS

| | | | |
|---|---|---|---|
| 5,005,122 | 4/1991 | Griffin et al. .......................... | 709/203 |
| 5,742,762 | 4/1998 | Scholl et al. .......................... | 709/200 |
| 5,758,355 | 5/1998 | Buchanan .................................. | 707/201 |
| 5,905,868 | 5/1999 | Baghai et al. .......................... | 709/224 |
| 6,006,238 | 12/1999 | Packard .................................. | 707/200 |
| 6,014,702 | 1/2000 | King et al. .............................. | 709/227 |
| 6,021,437 | 2/2000 | Chen et al. .............................. | 709/224 |

*Primary Examiner*—Krisna Lim
*Attorney, Agent, or Firm*—Staas & Halsey

[57] ABSTRACT

A load distribution system which is capable of carrying out appropriate load distributing on a WWW system. A server status notification section provided for each server subject to management collects processing requests sent to each server. A server status management section obtains the amount of processing of each server collected by the server status notification section to manage a load status of each server. A request distribution section within a client system obtains load information on the load status of each server from the server status management section. A request relay section delivers a server selection request when a processing request is generated by the client system. In response to the server selection request, the request distribution section determines a server experiencing less load, based on the load information.

17 Claims, 20 Drawing Sheets

LOAD DISTRIBUTION SYSTEM FOR DISTRIBUTING LOAD AMONG PLURALITY OF SERVERS ON WWW SYSTEM

BACKGROUND OF THE INVENTION

1. Field of the Invention

The present invention relates to a load distribution system, a session management system, a client system, a computer-readable recording medium storing a load distribution program, a computer-readable recording medium storing a session management program, and a computer-readable recording medium storing a local proxy server program, and more particularly to a load distribution system, a session management system, a client system, a computer-readable recording medium storing a load distribution program, a computer-readable recording medium storing a session management program, and a computer-readable recording medium storing a local proxy server program, which enable a WWW system to be used similarly to a client-server system.

2. Description of the Related Art

With the development of the Internet, "WWW(World Wide Web) browsers", which are client applications for accessing Hypertext Transfer Protocol (HTTP) files on WWW servers, have become common on many computers. Further, his comparatively recent WWW system is particularly excellent at its main function of fetching a HTML (Hyper Text Markup Language) document and displaying the content of the same. As seen in the case of an intra-company network (intranet), internet communication technology is increasingly being utilized in internal enterprise information systems for sharing information and supporting the business and services. Moreover, an attempt has been made to implement functions equivalent to those of a conventional client-server system using WWW system technology. However, in conventional implementations, the WWW system has fewer functions than the client-server system in many respects. For this reason, the following measures are taken to solve the problems that relate to specific uses of the WWW system.

A first problem concerns the concentration of information. The Internet utilizes the TCP/IP (Transmission Control Protocol/Internet Protocol) as the low level protocols that are used to implement HTTP (Hyper Text Transfer Protocol). The TCP/IP uses an IP address to locate and establish a session with another machine on the network. In such an environment, a load distribution device such as a router or a switching device, which is capable of sending TCP/IP packets containing an identical IP address to a plurality of WWW server computers, is used for carrying out load distribution so as to avoid load concentration onto a single WWW server.

In order to avoid load concentration, it is also possible to utilize a function of a mapping system of "DNS (Domain Name System) names" and IP addresses commonly utilized on the Internet for identifying individual computers on the network. For example, there is a method (hereinafter referred to as "DNS load distribution") of using distributed IP addresses, in which a plurality of IP addresses are assigned to one DNS name, and mapping is carried out on a round robin basis whenever a mapping request is delivered to DNS for mapping a DNS name to an IP address.

A second problem concerns continuity of communication. Much of the data transfer on the existing WWW system is implemented by a protocol referred to as "HTTP". According to this protocol, one communication cycle between a WWW browser and a WWW server is completed by one request from the WWW browser and one response from the WWW server. That is, a continuous connection is not maintained. Therefore, no communications capability with session management function is provided between a typical WWW browser and a typical WWW server. For this reason, there exists a WWW server or a service program that is executed on the WWW server which provides a session management function by itself. These are products provided as WWW server software or as middleware which provide a session management function as a feature inherent thereto. These functions are each implemented by passing session information determined by a server between the server and a WWW browser. Session information is passed using several methods, e.g. by using a Cookie, by embedding the information in the response HTML document as data which is not displayed by the WWW browser, or by adding the information as part of the address information contained in the request which is delivered subsequently. The "Cookie" mentioned above is an information file created by a WWW server and sent to a client to be stored in the client.

As described above, when a problem is encountered, a new technique is introduced to overcome the problem.

However, the conventional WWW system has not experienced radical improvement of the functions available in the system. Thus, there still remain the following problems:

First, in the conventional method of coping with the first problem described above, load can be concentrated on the load distribution device itself. In addition, the load distribution device is not trouble-free to a desired extent. Further, in the method which uses a load distribution device, it is not certain which WWW server will be selected for each communication using the TCP/IP (that is, there is no one-to-one relationship between sequential communications). This makes it difficult for a client to carry out a predetermined range of communication with the same WWW server, which is different from the case of session management using user data on HTTP which uses the TCP/IP protocol as lower level protocols.

Moreover, in the DNS load distribution, in general, once a user of an IP address (e.g. a computer on which a WWW browser is operating) has mapped a DNS name to an IP address, the mapping result is stored on the user's end for an extended time period, which makes it difficult to perform timely load distribution.

In the conventional method of coping with the second problem described above, the inconvenience concerning security (as to the method using Cookie) and restriction on the document preparation rules (as to the method of embedding information in an HTML document) cannot be overcome. Further, all of the above methods require extension of WWW server functions or WWW browser functions. For this function extension, however, each individual product has to be dealt with, which requires an extensive effort.

As described above, in order to provide the same functions as the existing client-server system does, the WWW system requires many more capabilities than the system currently provides. This problem remains unsolved.

SUMMARY OF THE INVENTION

It is a first object of the invention to provide a load distribution system which is capable of carrying out appropriate load distribution on a WWW system.

It is a second object of the invention to provide a session management system which is capable of carrying out a continuous session management on a communication protocol in which one cycle of communication between a client and a server is completed by one request from the client and one response from the server, without changing existing programs.

It is a third object of the invention to provide a client system which is capable of having processing similar to processing carried out by a client-server system, carried out by using a typical WWW browser.

It is a fourth object of the invention to provide a computer-readable medium storing a load distribution program for carrying out appropriate load distribution on a WWW system.

It is a fifth object of the invention to provide a computer-readable medium storing a session management program for carrying out a continuous session management on a communication protocol in which one cycle of communication between a client and a server is completed by one request from the client and one response from the server, without changing existing programs.

It is a sixth object of the invention to provide a computer-readable medium storing a local agent server program for making it possible to have processing similar to processing carried out by a client-server system, carried out by using a typical WWW browser.

To attain the first object, according to a first aspect of the invention, there is provided a load distribution system for distributing load among a plurality of servers. The load distribution system is comprising server status notification means provided for each of the servers, for collecting processing requests sent to the each of the servers, and sending out information on an amount of processing of the each of the servers, server status management means for obtaining the amount of processing of the each of the servers collected by the server status notification means to manage a load status of the each of the servers, and client systems, each of the client systems having request distribution means which obtains load information on the load status of the each of the servers from the server status management means and is responsive to a sever selection request for determining a destination server to which a processing request should be delivered based on the load information on the load status of the each of the servers, and request relay means which is responsive to a processing request for delivering the server selection request to the request distribution means, and delivers the processing request to the destination server determined by the request distribution means.

To attain the second object, according to a second aspect of the invention, there is provided a session management system that carries out session management based on a communication protocol in which one cycle of communication between a client and a server is complete by one request from the client and one response from the server to the one request. The session management system is comprising a client system, the client system having slave session management means which generates client session information when processing subject to the session management is started, to deliver the client session information, and delivers the client session information generated when the processing subject to the session management was started, for a processing request on an established session, and communications relay means which receives the client session information from the slave session management means when a processing request for the processing subject to the session management is received, and adds the client session information to the processing request for the processing subject to the session management to deliver the resulting processing request; and a server system, the server system having master session management means for storing session IDs each comprising a pair of client session information and server session information, the master session management means generating server session information when a processing request containing added client session information which has not yet been stored by the master session management means is received, to thereby store a new session ID comprising the added client information and the generated server session information, and at the same time adding the new session ID to the processing request received to deliver the resulting processing request to a destination thereof, while when a processing request containing client session information which has already been stored by the master session management means is received, the master session management means adding one of the session IDs stored thereby which corresponds to the client session information contained in the processing request to the processing request received to thereby deliver the resulting processing request to a destination thereof.

To attain the third object, according to a third aspect of the invention, there is provided a client system connected via a network to a server system having server status management means for managing a load status of each of a plurality of servers through managing information on a count of processing requests addressed to the each of the servers. The client system is comprising request distribution means which obtains load information on the load status of the each of the servers from the server status management means and determines a destination server to which a processing request should be delivered based on the load information on the load status of the each of the servers when a sever selection request is received; and request relay means which delivers the server selection request to the request distribution means when a processing request is received, and delivers the processing request to the destination server determined by the request distribution means.

To attain the fourth to sixth objects of the invention, according to fourth to sixth aspects of the invention, there are provided computer-readable media storing programs respectively corresponding to the first to third aspects of the invention.

The above and other objects, features and advantages of the invention will become apparent from the following description when taken in conjunction with the accompanying drawings which illustrate preferred embodiments of the present invention by way of example.

DESCRIPTION OF THE PREFERRED EMBODIMENTS

Several preferred embodiments of the present invention will be described below with reference to the accompanying drawings.

Figure 1:
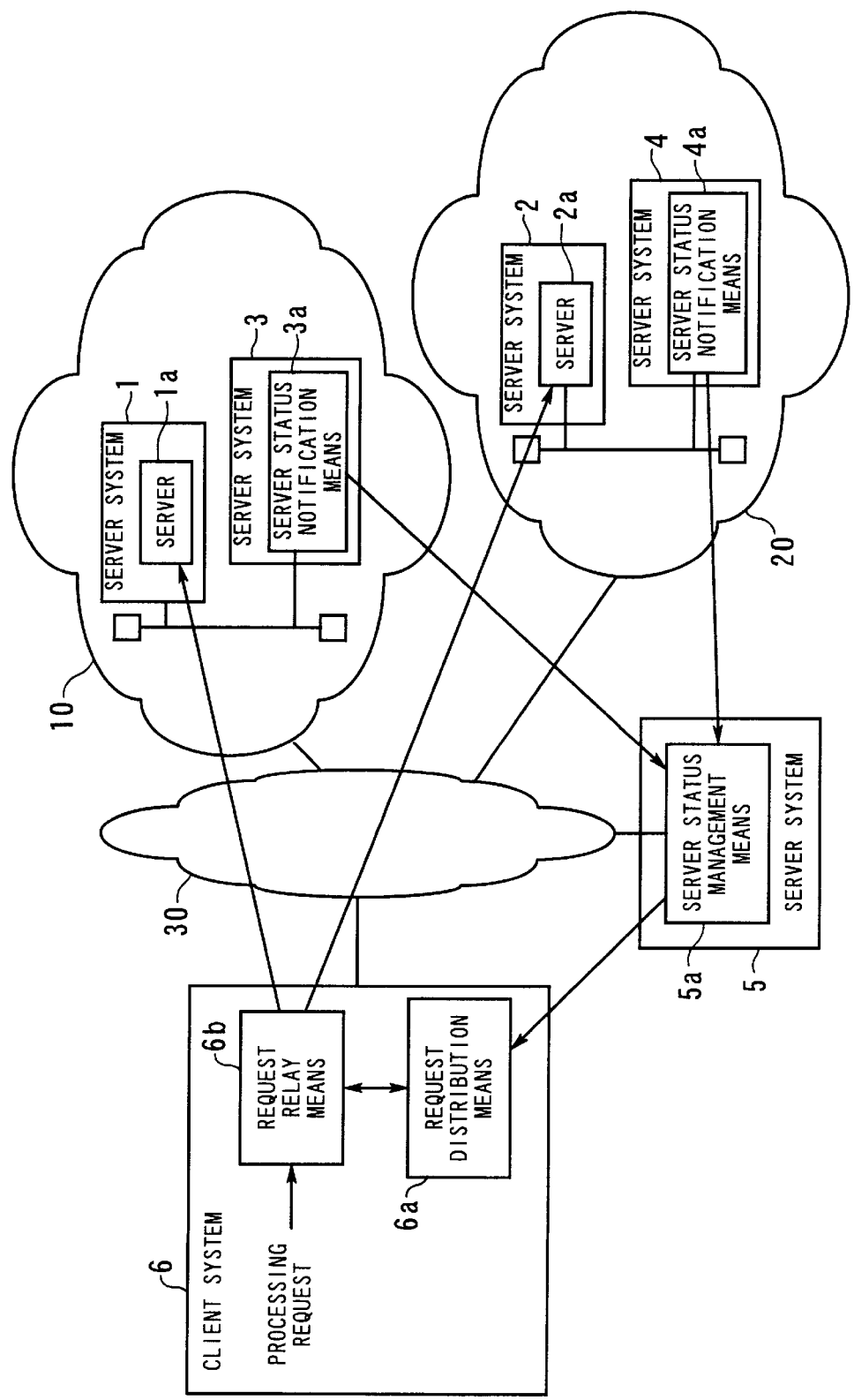
FIG. 1 is a conceptual diagram showing principles of the present invention.

Referring first to FIG. 1, the principles of a load distribution system are explained. Servers (processing capabilities realized by executing processes that provide specific functions) 1a, 2a used to provide processing functions are installed in server systems (computers for providing processing functions) 1 and 2, respectively. The servers 1a, 2a provide an identical function. The server systems 1, 2 are connected to Local Area Networks (LANs) 10 and 20 respectively. The LANs 10 and 20 include respective server systems 3, 4 each having server status notification means 3a, 4a. The server status notification means 3a, 4a capture processing requests addressed to the server 1a, 2a designated as respective servers subject to management.

A server system 5 including server status management means 5a is connected to the LANs 10, 20 via a wide-area network 30. The server status management means 5a obtains information on the amount of processing of the server 1a, 2a collected by the server status notification means 3a, 4a, so as to manage the load on each of the servers 1a, 2a.

A client system 6 is connected to the server system 5 via the wide-area network 30. The client system 6 includes request distribution means 6a and request relay means 6b. The request distribution means 6a obtains information on the load on each of the servers 1a, 2a from the server status management means 5a, and when it receives a server selection request, it determines which server should process any specific request based on the information of the load on each server at the time. The request relay means 6b delivers a server selection request to the request distribution means 6a after having received a processing request, and then outputs the processing request to the server selected by the request distribution means 6a.

According to the load distribution system described above, processing requests addressed to the servers 1a, 2a are captured by the server status notification means 3a, 4a respectively. The amount of processing of the captured processing requests is obtained by the server status management means 5a, which delivers information concerning the load on the servers 1a, 2a to the request distribution means 6a within the client system 6.

Thereafter, when the request distribution means 6a outputs a processing request, the request is received by the request relay means 6b, which in turn delivers a server selection request to the request distribution means 6a. The request distribution means 6a selects the server which is experiencing the lowest load, based on the load information concerning the servers 1a, 2a obtained from the server status management means 5a. The selection is then sent to the request relay means 6b. The request relay means 6b then outputs the processing request to the server selected by the request distribution means 6a.

Thus, the processing request sent by the client system 6 can be assigned to the server 1a, 2a, or the like which has the lower load at the time. In this case, the load distribution is carried out within respective client systems 6, so that it is possible to prevent any resulting processing (e.g. load distribution) from being centralized on a location in the network.

The present invention as described above can easily be applied to a WWW system. The invention makes it possible to carry out effective load distribution without making any modification to the functions of WWW browsers which output processing requests and WWW servers that provide processing. In this case, the functions of the request distribution means 6a and the request relay means 6b are implemented by using technology of a Hypertext Transfer Protocol (HTTP) Proxy server (agent server) incorporated into the LAN environment.

Originally, a proxy server operating on an individual computer on the Internet had the function of transferring requests from a plurality of WWW browsers to a plurality of WWW servers. The proxy server is also capable of caching static files (e.g. HTML files) obtained from a WWW server when the proxy server communicated with the WWW server, and returning the cached resources when receiving a request for these resources. Additionally, some proxy servers have security management functions (e.g. a firewall).

In general, a WWW browser can designate an option concerning whether to use a proxy server, and if a proxy server is used, it can specify the Domain Name Server (DNS) name (or IP address) of the proxy server. When it is specified that a WWW browser use a proxy server in delivering a request to a WWW server, the WWW browser establishes a TCP/IP connection with the proxy server to transmit the request. In the transmission, address information for the WWW server is added as HTTP information contained in the request. In this case, it is not required to establish direct connection with the WWW server. Further, the TCP/IP protocol has the property of making no distinction between a communication program on one machine and the identical communication program on a different machine.

Accordingly, the load distribution system of the present invention can be applied to a WWW system by operating a proxy server on the same machine on which is operated a WWW browser having typical functions. The proxy server for this use is hereinafter referred to as the "local proxy server". Further, the use of a local proxy server enables management of a continuous session between a WWW browser and a WWW server, providing the same functions that a conventional client-server system has.

Next, description will be made of an embodiment for providing a WWW system with functions equivalent to those of a client-server system through the use of a local proxy server.

Figure 2:
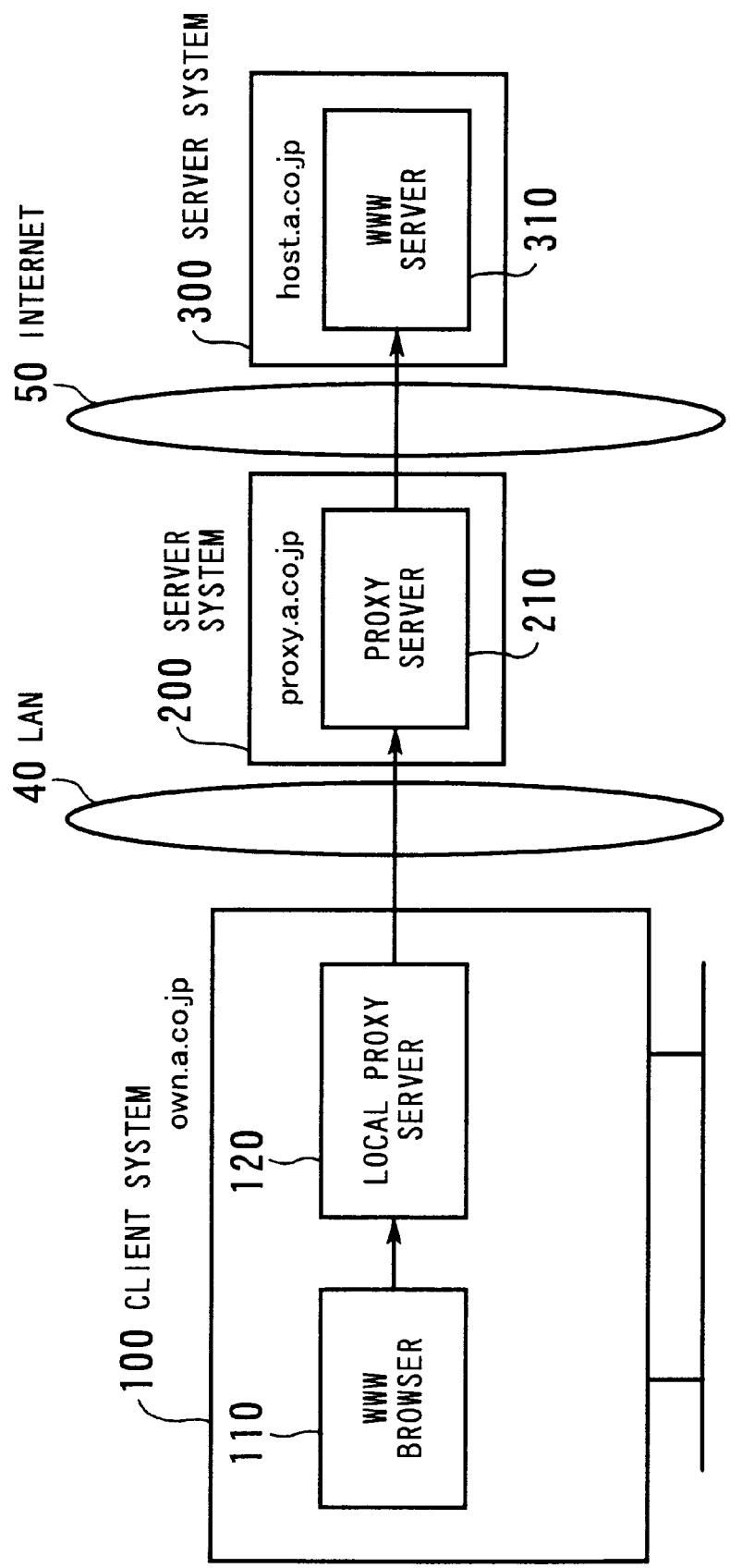
FIG. 2 is a section diagram showing a system configuration according to an embodiment of the invention.

FIG. 2 shows a system configuration according to the embodiment of the present invention. A client system 100 on which a WWW browser 110 and a local proxy server 120 run is connected via a LAN 40 to a server system 200 in which a proxy server 210 runs. The server system 200 is connected via the Internet 50 to a server system 300 on which a WWW server 310 runs. It is assumed that the client system 100 has a DNS name of "own.a.co.jp", and the server systems 200 and 300 have DNS names of "proxy.a.co.jp" and "host.a.co.jp", respectively.

For the WWW browser 110, the local proxy server 120 running on the same computer that the WWW browser 110 is running is designated as a proxy server for all of the WWW servers 310 (the proxy server is designated by the address of "own.a.co.jp"). Thus, the WWW browser 110 delivers all requests to the local proxy server 120.

The local proxy server 120 includes an HTTP communication relay section which transmits each request to a host WWW server or proxy server based on information provided by the client system 100 in which the local proxy server 120 itself is operating. Thus, essential communication functions are implemented.

The system configuration described above makes it possible to implement functions essential to the present invention without modifying the functions of existing WWW browsers or WWW servers. First, the processing to be executed for effective load distribution will be described below.

Figure 3:
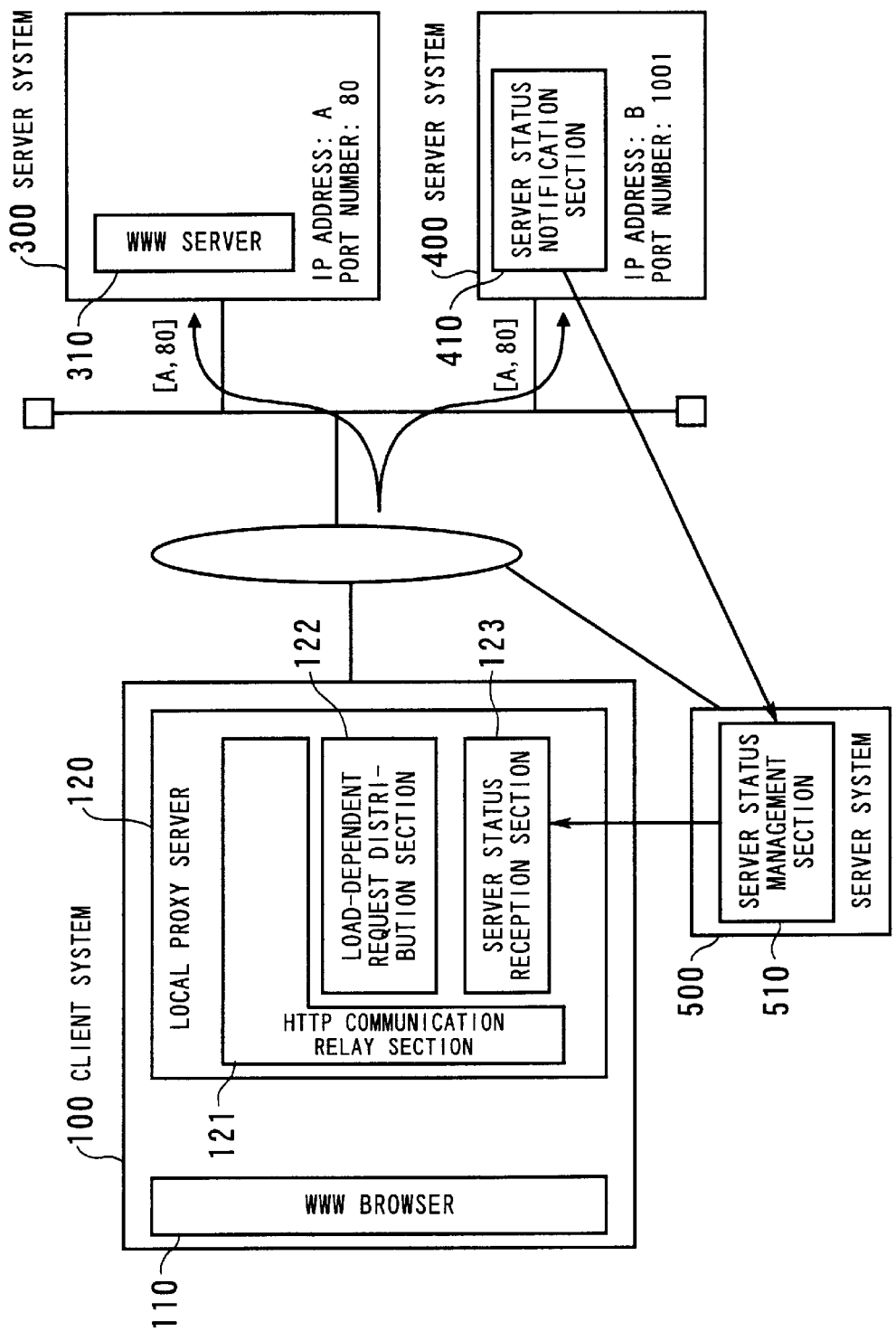
FIG. 3 is a section diagram showing a system configuration for carrying out load distribution.

FIG. 3 shows a system configuration for executing the load distribution. The local proxy server 120 includes the HTTP communication relay section 121, a load-dependent request distribution section 122, and a server status reception section 123. The HTTP communication relay section 121 sends each request to a host WWW server or proxy server. The load-dependent request distribution section 122 receives information on the operating status of each server from the server status reception section 123 and specifies a WWW server which has the lowest load among all WWW servers capable of providing the processing requested by the WWW browser 110. The server status reception section 123 receives information on the operating status of each server connected to the network from a server status management section 510 running on a server system 500, to deliver the information to the request distribution section 122.

A server system 400 connected to the same IP segment that the server system 300 in which the WWW server 310 is connected to is operating includes a server status notification section 410. The server status notification section 410 recognizes the address of the WWW server 310 to be monitored by the section 410. In the case of TCP/IP, the address of a WWW server consists of an IP address and a port number. For instance, if the IP address of the server system 300 is "A" and the port number of the WWW server 310 is "80", and the IP address of the server system 400 is "B" and the port number of the server status notification section 410 is "1001", information for the IP address "A" and the port number "80" is added to a packet of a processing request addressed to the WWW server 310. This packet is sent to all of the systems connected to the same IP segment that the server 300 is connected to. The WWW server 310 recognizes that the request is sent to itself by the IP address and the port number. At the same time, the server status notification section 410 also recognizes the request sent to the WWW server 310. Then, the section 410 measures the number of IP packets (packets per unit time) sent to the WWW server 310 to thereby recognize the load being experienced by the WWW server 310.

Further, the server status notification section 410 informs the server status management section 510 running on the server system 500 of statistics information of the load status of the WWW server 310 collected over a predetermined time interval. Moreover, whenever recognizing a change in the operating status of the WWW server 310 (i.e. from operative status to inoperative status or from inoperative status to operative status), the section 410 notifies the server status management section 510 of the change in the operating status of the WWW server 310. Thus, an increase in load on a communication channel due to notification of the load on the WWW server 310 can be minimized.

The server status management section 510 notifies registered server status reception sections 123 of the status of each of respective WWW servers 310 on the network. Registration of each server status reception section 123 in a register file in the server status management section 510 is executed by once sending an HTTP request (containing predetermined data) from the server status reception section 123 to the server status management section 510 during operation of the WWW browser 110.

Notification of the status of the WWW server 310 from the server status management section 510 to the server status reception section 123 is carried out according to any one of the following methods:

A first method is to notify the status of the WWW server to the server status reception section 123, when the server status management section 510 has recognized a change in the status of the WWW server. The change is recognized through the notification sent from the server status notification section 410. In this case, the server 10 status management section 510 actively establishes connection with the server status reception section 123 to inform this system of the status of the WWW server.

Figure 4:
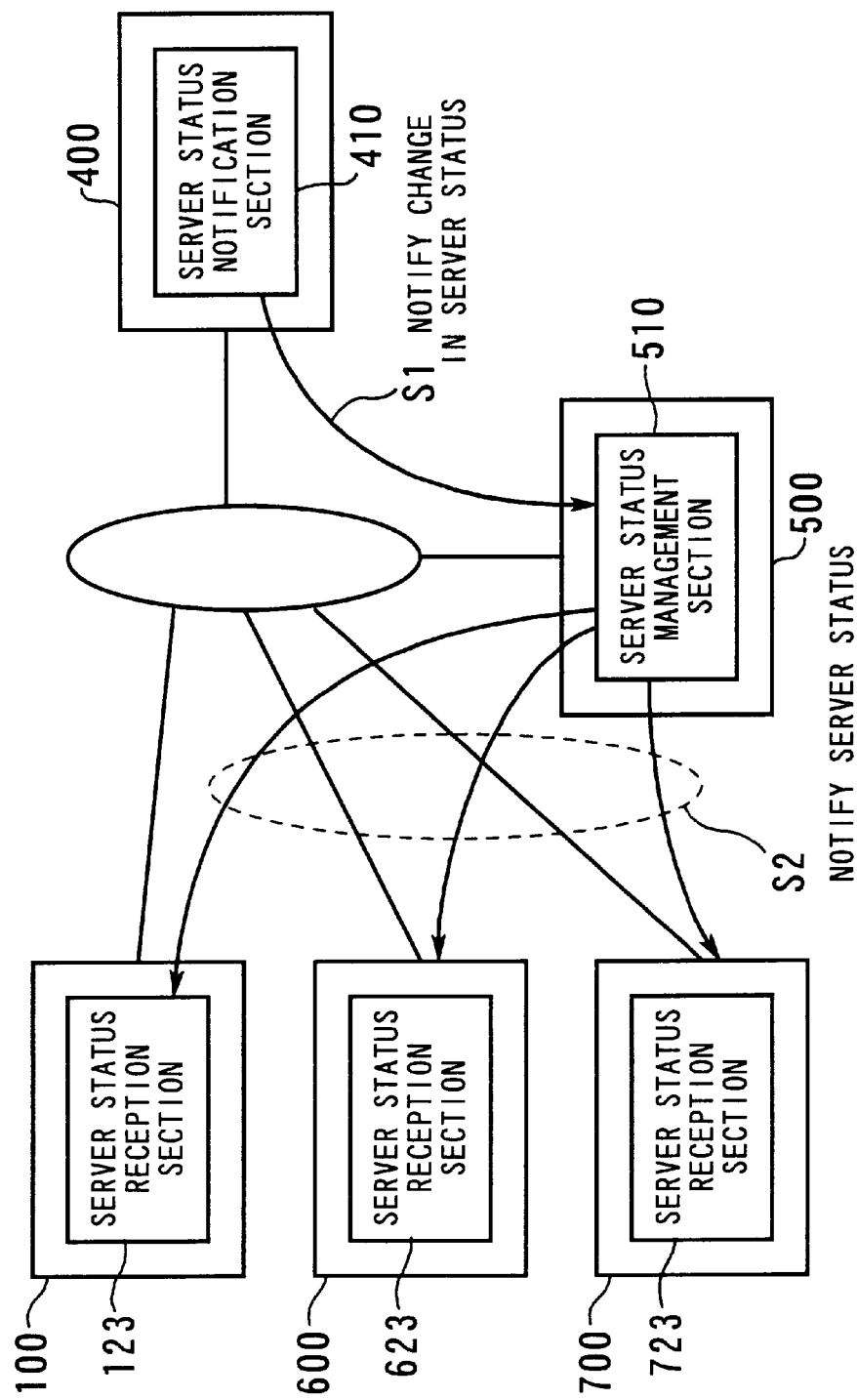
FIG. 4 is a diagram which is useful in explaining a method for performing notification of a WWW server status in response to a change in the WWW server status.

FIG. 4 illustrates the first method. The server status notification section 410 notifies the server status management section 510 of the status of the WWW server at desired timing (S1). The server status management section 510 then notifies the server status reception sections 123, 623, 723 running on all of the registered client systems 100, 600, 700, of the change in server load status.

A second method is for the server status reception section 123 to actively send a request for notification of the status of a WWW server to the server status management section 510 in response to an instruction sent by the HTTP communication relay section whenever the WWW browser generates the request for the notification.

Figure 5:
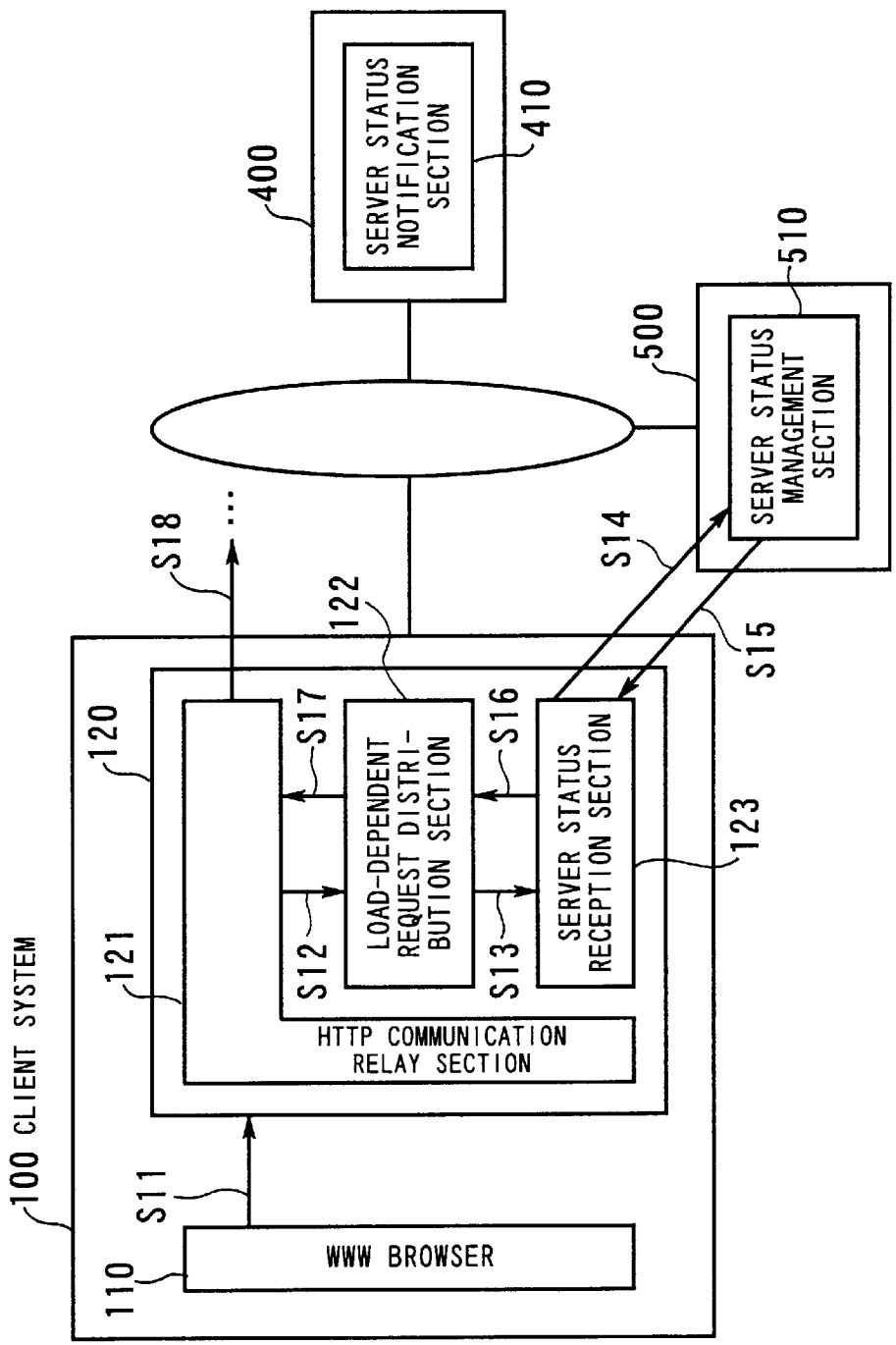
FIG. 5 is a diagram which is useful in explaining a method for performing notification of the WWW server status in response to a request from a WWW browser.

FIG. 5 illustrates the second method. When the WWW browser 110 sends a request for processing to a WWW server (S11), the HTTP communication relay section 121 queries the request distribution section 122 as to which server is to be selected (S12) for sending the request for processing. In response to this query, the request distribution section 122 sends a request for an update of data on the WWW server load status to the server status reception section 123 (S13). The server status reception section 123 then sends a request for information on the server status to the server status management section 510 (S14). The server status management section 510 notifies the server status reception section 123 of the latest information on the server status (S15). The server status reception section 123 transfers this information to the request distribution section 122 (S16). The section 122 then selects a server that is experiencing the lowest load based upon this data. The HTTP communication relay section 121 is then informed of the selection result (S17). The HTTP communication relay section 121 then routes the request to the WWW server which has been selected by the request distribution section 122 (S18).

A third method is for the server status management section 510 to actively notify the server status to the server status reception section 123 at predetermined time intervals.

To carry out load distribution, a plurality of WWW servers which provide identical processing functions are required. When a plurality of WWW servers provide identical functions, an address (DNS name: representative DNS name) for an integrated system of the servers is employed. When the integrated system, and hence the representative DNS name, is used, it is possible to employ either of the following methods to accomplish load distribution: One method in which information on all existing WWW servers including load information is sent to the server status reception section 123 by the server status management section 510, and the other method in which the server status management section 510 specifies a WWW server which is to provide the processing requested by a specific WWW browser, which then informs the server status reception section 123 associated with the WWW browser of the address of the selected WWW server. According to the former method, the request distribution section 122 makes a judgment based on the load status and operating status of each of the available WWW servers and then selects the WWW server to which the processing request is to be addressed. In this manner, load distribution throughout the entire WWW system may be realized. According to the latter method, the server status management section 510 controls the load applied to the whole WWW system, which allows single point management of load distribution. In the following description, it is assumed that the former method is employed.

When a WWW server is selected by load distribution processing, it is required to execute address translation processing as required by the WWW browser 110. Next, a method of address translation will be described.

Figure 6:
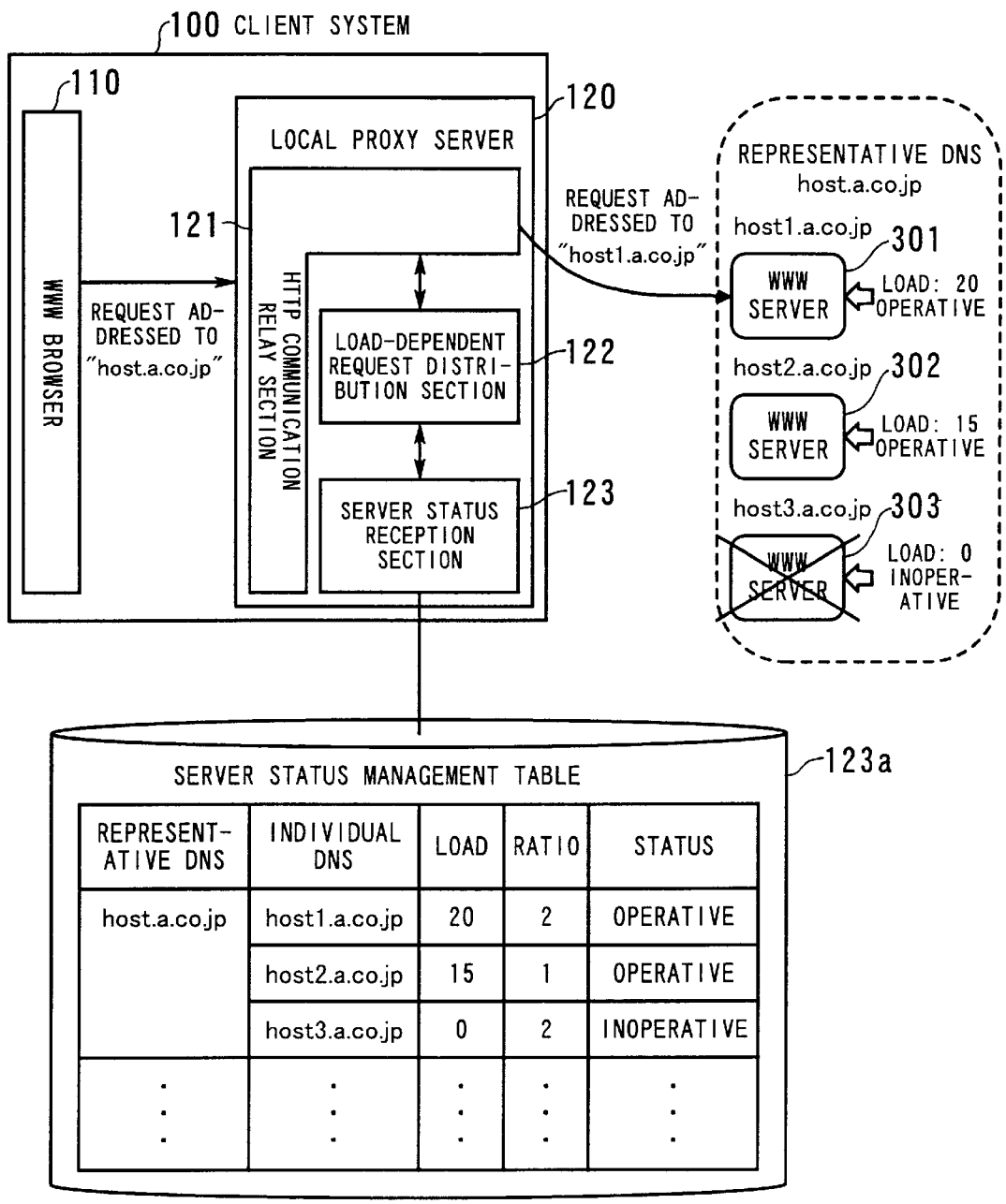
FIG. 6 is a diagram which is useful in explaining a method for performing address translation in a load-dependent request distribution section.

FIG. 6 is a diagram useful in explaining the address translation method executed in the request distribution section. In the illustrated example of the address translation method, a representative DNS name "host.a.co.jp" is used to allow three WWW servers 301, 302, 303 to execute processing. The three WWW servers 301 to 303 have respective DNS names of "host1.a.co.jp", "host2.a.co.jp" and "host3.a.co.jp".

The server status reception section 123 manages information received from the server status management section 510 by using a server status management table 123*a*. The request distribution section 122 can refer to the server status management table 123*a*, via the server status reception section 123. The server status management table 123*a*, includes columns having headings of "REPRESENTATIVE DNS", "INDIVIDUAL DNS", "LOAD", "RATIO", and "STATUS". Under the heading of the "REPRESENTATIVE DNS", representative DNS names of WWW server groups are registered to which load is to be distributed. Under the heading of "INDIVIDUAL DNS", there are stored individual DNS names of respective individual WWW servers integrated into a system represented by the representative DNS name. Under the heading of the "LOAD", there is stored load or packets per unit time being processed by a corresponding WWW server having an individual DNS name listed therein. Under the heading "RATIO", there are shown processing rates of the respective WWW servers relative to that of a specific reference WWW server. In the example shown in FIG. 5, the processing rate of the WWW server 301 having the DNS name of "host1.a.co.jp" is twice as high as a reference value, that of the WWW server 302 having the DNS name of "host2.a.co.jp" is equal to the reference value, and that of the WWW server 303 having the DNS name of "host3.a.co.jp" is also twice as high as the reference value. Under the heading "STATUS", there are shown the operating status of each respective WWW server which is designated by the terms "OPERATIVE" or "INOPERATIVE".

In this example, the WWW server 301 is operative, i.e. in operation, and the load thereon is listed as "20". The WWW server 302 is also in operation, and the load thereon is listed as "15". On the other hand, the WWW server 303 is inoperative i.e. in stoppage, and as a result the load thereon is "0".

When the WWW browser 110 outputs a processing request addressed to the representative DNS name "host.a.co.jp", the DNS name is sent to the request distribution section 122 from the HTTP communication relay section 121. The request distribution section 122 looks up the server status management table 123*a* to determine which WWW server is operating with the smallest relative amount of processing. The relative amount of processing is obtained by dividing the "load" value by the "ratio" value. In the illustrated example, in which the WWW servers "host1.a.co.jp" and "host2.a.co.jp" are in operation, the relative amount of processing of the server "host1.a.co.jp" is calculated as "20÷2=10", while the relative amount of processing of the server "host2.a.co.jp" is calculated as "15÷1=15". Accordingly, it is judged that the server "host1.a.co.jp" has more capacity for accomplishing the required processing than the server "host2.a.co.jp". The result is that the request distribution section 122 makes the determination to send the request from the WWW browser 110 to the WWW server 302 with the DNS name of "host1.a.co.jp".

The HTTP communication relay section 121 translates the group name "host.a.co.jp" sent by the WWW browser 110 into the individual DNS name "host1.a.co.jp" selected by the request distribution section 122, and sends the processing request out onto the network. The processing request is then passed to the WWW server 301 based on the INDIVIDUAL DNS name "host1.a.co.jp", followed by the required processing being executed.

Thus, load distribution can be carried out effectively. It should be noted that the status of each server can be changed as desired by issuing a command to the server system 500 (see FIG. 3). If the status of a WWW server is registered as "inoperative" in the table of the server status management section 510 during maintenance on the server, any processing request is inhibited from being delivered to this WWW server, thereby allowing any required maintenance to be performed safely.

Figure 7:
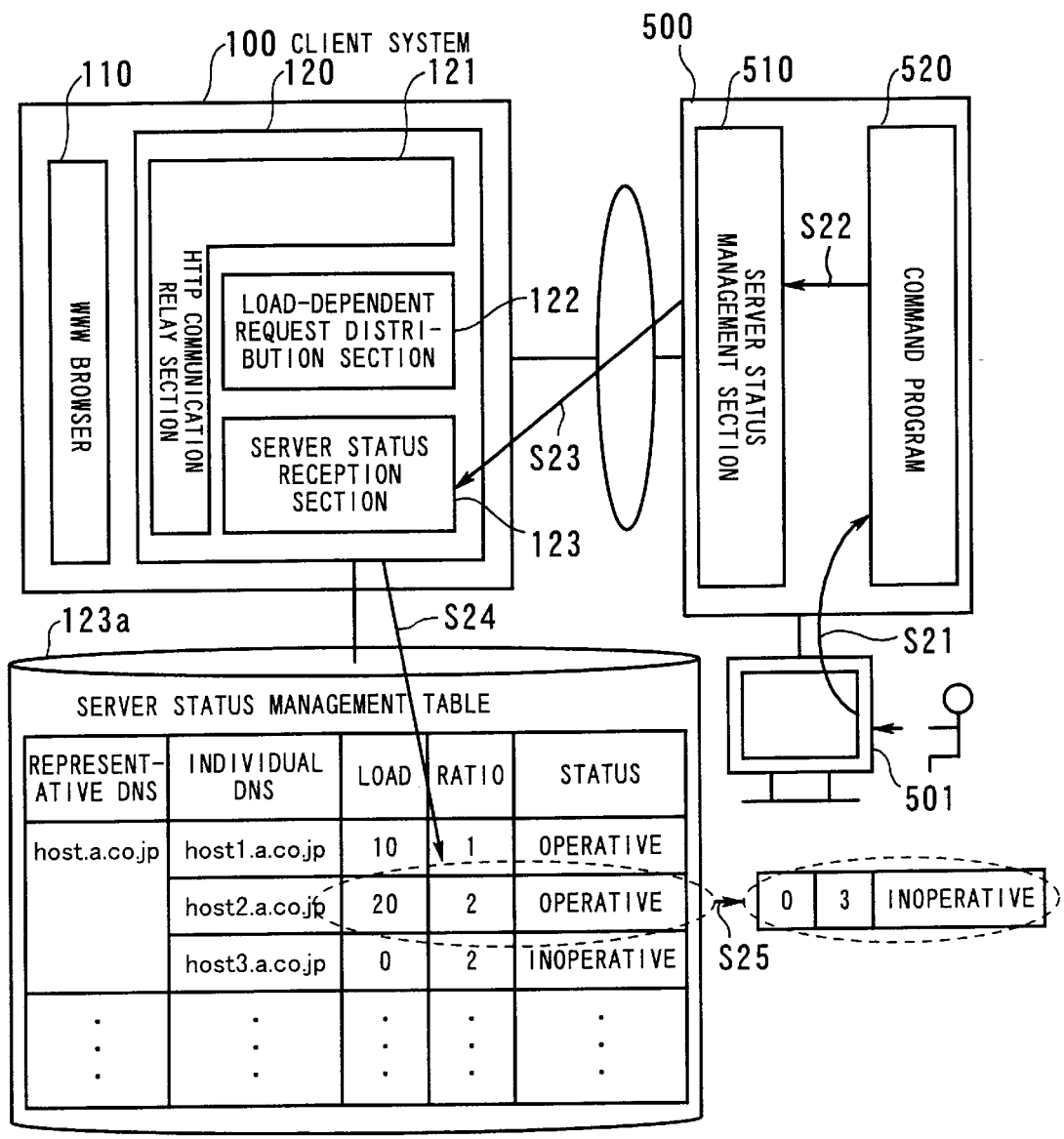
FIG. 7 is a diagram showing a system configuration for instructing a server status management section on a desired status of a server.

FIG. 7 shows a system configuration used for instructing the server status management section 510 to store a designated state of a specific WWW server. A status changing command is entered into a command program 520 by the system administrator's input to a terminal device or in response to a request from a system program (S21). The command program 520 notifies the server status management section 510 of a change in the status (S22). This notification is identical with the one delivered to the server status management section 510 by the server status notification section 410 (see FIG. 3). However, the contents of a setting by the command program 520 remain fixed until a setting cancellation command is input. The setting cancellation command is entered into the command program 520 by operation of the terminal device 501 or in response to a request from the system program. The server status management section 510 notifies the server status reception section 123 of the server status (S23). The server status reception section 123 changes the server status management table based on the notification from the server status management section 510. In FIG. 7, the status of the WWW server "host2.a.co.jp" is changed from "OPERATIVE" to "INOPERATIVE". At the same time, "LOAD" is changed from "20" to "0", and "RATIO" from "2" to "3".

As described above, it is possible to reduce the load on a specific WWW server or inhibit any request from being delivered to any WWW server which is undergoing maintenance, by changing the registered status of the server.

HTTP is a one-response-to-one-request type protocol in which processing is completed by one request and one response to the request. Next, description will be made of a system that uses HTTP to realize continuous session management without expanding the capabilities of a WWW browser or a WWW server.

Figure 8:
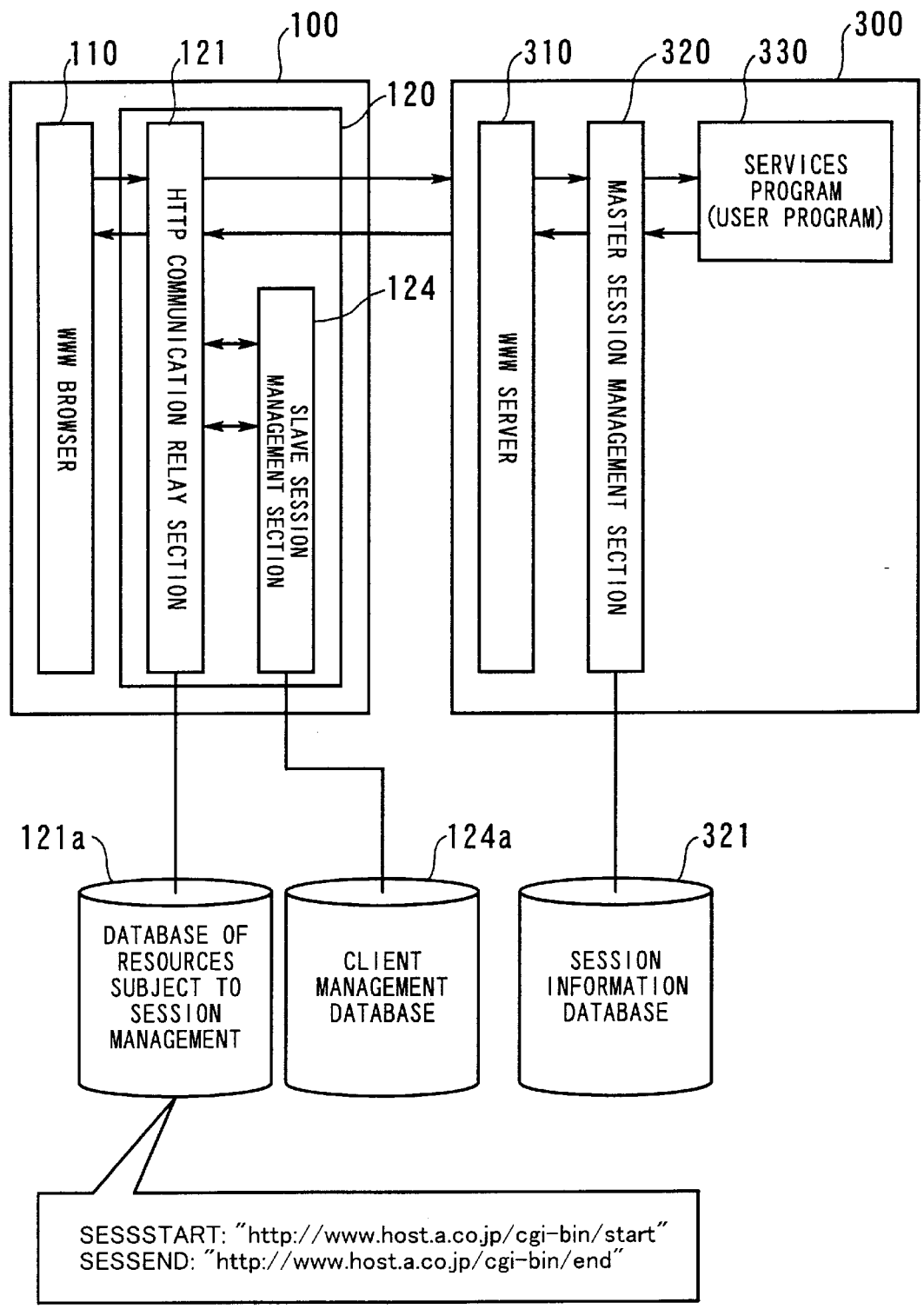
FIG. 8 is a diagram showing a system configuration for implementing continuous session management.

FIG. 8 shows a system configuration for implementing continuous session management. The local proxy server 120 incorporates a session management section 124. Further, the server system 300 on which the WWW server 310 runs incorporates a session management section 320. In this configuration, the session management section 320 serves as a master, while the session management section 124 serves as a slave.

The HTTP communication relay section 121 includes a resource database 121a that stores information on resources subject to session management. The slave session management section 124 includes a client management database 124a that stores information concerning each pair of a client session and a URL (Uniform Resource Locator) of a requested resource. Further, the master session management section 320 includes a session information database 321.

The resource database 121a stores the names of servers' programs subject to session management. In the illustrated example, a program named "http://www.host.a.co.jp/cgi-bin/start" shown as "SESSSTART" starts session management, while a program named "http://www.host.a.co.jp/cgi-bin/end" shown as "SESSEND" terminates session management.

The client management database 124a stores information concerning each pair of client session information and a URL, and the session information database 321 stores each pair of client session information and server session information.

Further, in the server system 300, a services program 330 runs to provide various services. In the illustrated example, the services program 330 is activated by the WWW server 310 through an interface called the Common Gateway Interface (CGI) whenever a request is sent by a WWW browser. To activate the services program 330, it is possible to use other popular interfaces, such as an Netscape Application Programming Interface (NSAPI) marketed by Netscape Communications Corp. or the Internet Server Application Programming Interface (ISAPI) by Microsoft Corp.

When the HTTP communication relay section 121 is informed of a request for a specific resource of a specific WWW server that is listed in the resource database 121a (i.e. a request for starting session management), from the WWW browser 110, the following processing is executed.

The request for the specific resource on a specific WWW server is designated by a URL (Uniform Resource Locator). The URL represents addressing information for each available resource, and is used to identify a resource by HTTP. A URL consists of a DNS name and a specific resource name, which is located on a WWW server.

Figure 9:
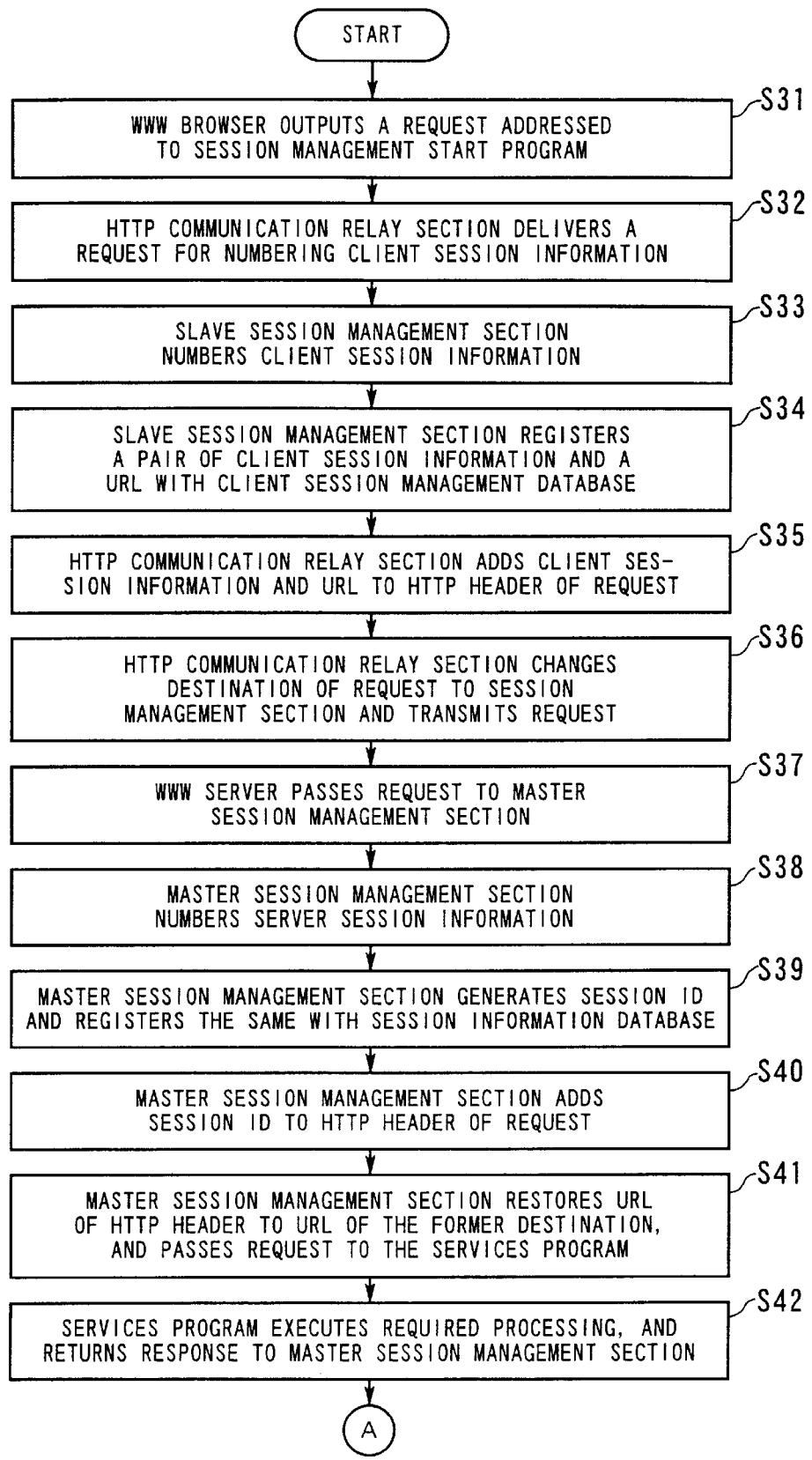
FIG. 9 is a flowchart showing a first half of a routine for starting session management.

FIG. 9 shows the first half of a routine for starting session management. The processing will be described in order of the step numbers appearing in the figure.

[S31] The WWW browser 110 outputs a request addressed to the session management start program (http://www.host.a.co. jp/cgi-bin/start).

[S32] The HTTP communication relay section 121 recognizes the necessity of starting session management by referring to the resource database 121a, and delivers a request for numbering client session information to the session management section 124.

[S33] The session management section 124 numbers client session information. The client session information is an identification number used to identify a WWW browser that has sent a request. The use of this client session information number makes it possible to identify a plurality of WWW browsers individually as they deliver requests for session management.

[S34] The session management section 124 pairs the client session information with a URL, and registers the pair of the identification number and the URL with the client session management database 124a.

[S35] The HTTP communication relay section 121 adds the client session information and the URL to the HTTP header of the request.

[S36] The HTTP communication relay section 121 changes the destination of the request to the session management section 320 and then transmits the request.

[S37] The WWW server 310 passes the request to the session management section 320.

[S38] The session management section 320 numbers server session information.

[S39] The session management section 320 registers the pair of the client session number and the server session number (which constitute a session ID) with the session information database 321. The server session information is an identification number for identifying a session established between the WWW server 310 and each of the plurality of WWW browsers making requests.

[S40] The session management section 320 adds the session ID to the HTTP header of the request.

[S41] The session management section 320 restores the URL of the HTTP header to the URL of the former destination, and passes the request to the services program 330. At the same time, the services program 330 is notified of the session ID as data number in the CGI. From this time on, the services program 330 recognize a request having the identical session ID added thereto as one from the identical WWW browser in the identical continuous session.

[S42] The services program 330 executes the required processing, and then returns a response to the session management section 320.

Figure 10:
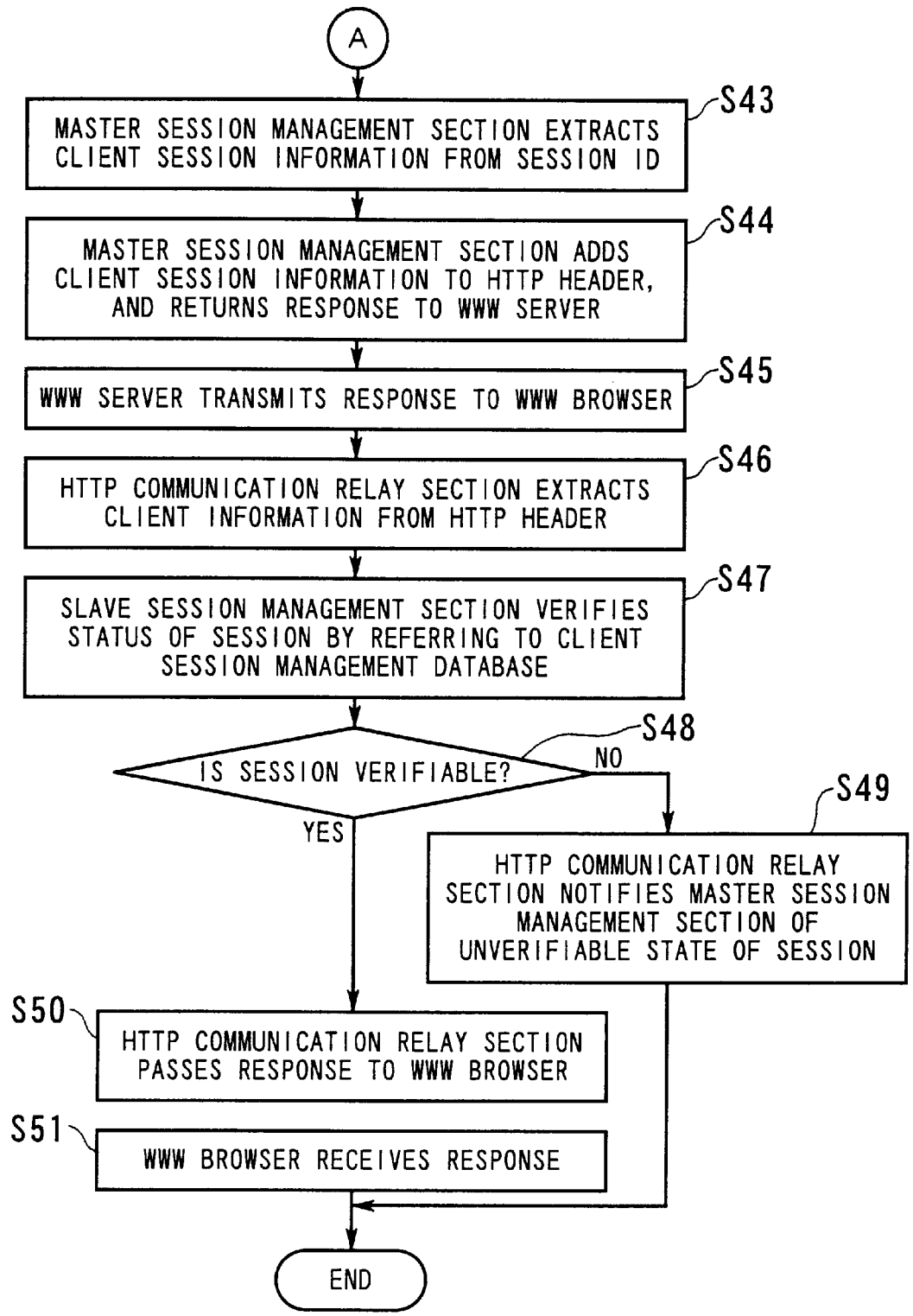
FIG. 10 is a flowchart showing a second half of the FIG. 9 routine.

FIG. 10 shows the second half of the routine for starting session management.

[S43] The session management section 320 extracts the client session information from the session ID.

[S44] The session management section 320 adds the client session information to the HTTP header, and then returns a response to the WWW server 310. It should be noted that the CGI interface can be utilized to add the client session information to the HTTP header.

[S45] The WWW server 310 transmits the response to the WWW browser 110.

[S46] The HTTP communication relay section 121 receives the response from the WWW server 310, and checks if the client session information has been added to the HTTP header of the response. If the client session information has been added, the HTTP communication relay section 121 transfers the information to the session management section 124.

[S47] The session management section 124 verifies the status of the session by referring to the client session management database 124a. In some cases, the WWW browser 110 issues a command for cancellation of a request before a response to the request is returned by the WWW server 310. Therefore, the verification is conducted to check if the request has not been canceled.

More specifically, when a command for cancellation of a session is issued by the WWW browser 110 in the time between delivery of a processing request for session management to the WWW server and return of a response to the request, the session management section 124 deletes the information corresponding to the request, which is registered with the client management database 124a, whereby the session is canceled on the client system 100. In some cases, however, a response to the request is returned by the WWW server 310 after the cancellation. Therefore, when receiving a response from the WWW server 310, the HTTP communication relay section 121 queries the session management section 124 as to presence of the client session information corresponding to the response, so as to verify the status of the session.

[S48] The HTTP communication relay section 121 determines whether or not the status of the session is verifiable by the session management section 124. If the session is verifiable, the program proceeds to a step S50, whereas if the session is unverifiable, the program proceeds to a step S49.

[S49] The HTTP communication relay section 121 notifies the session management section 320 of the fact that the session has been unverifiable, followed by terminating the program. That is, if the status or validity of the session is determined to be unverifiable, it is determined that the session has been canceled, and a notification of the cancellation is sent to the session management section 320, according to which the session management section 320 deletes the session ID associated with the session from the session information database 321.

[S50] The HTTP communication relay section 121 passes the response to the WWW browser 110.

[S51] The WWW browser 110 receives the response, followed by terminating the program.

The above processing is executed when the WWW browser sends a request for starting session management. This establishes a continuous session between the WWW server 310 and the WWW browser 110. From then on, whenever the WWW browser 110 sends a request for the resource whose session is stored in the client session management database 124a, the client session information is added to the request, and then the request is transmitted. Thus, the session management section 320 can identify the request as one in the identical session based on the information stored in the session management database 321.

Next, description will be made of a routine for processing that is executed when the WWW browser 110 sends a processing request for which a session is already established.

Figure 11:
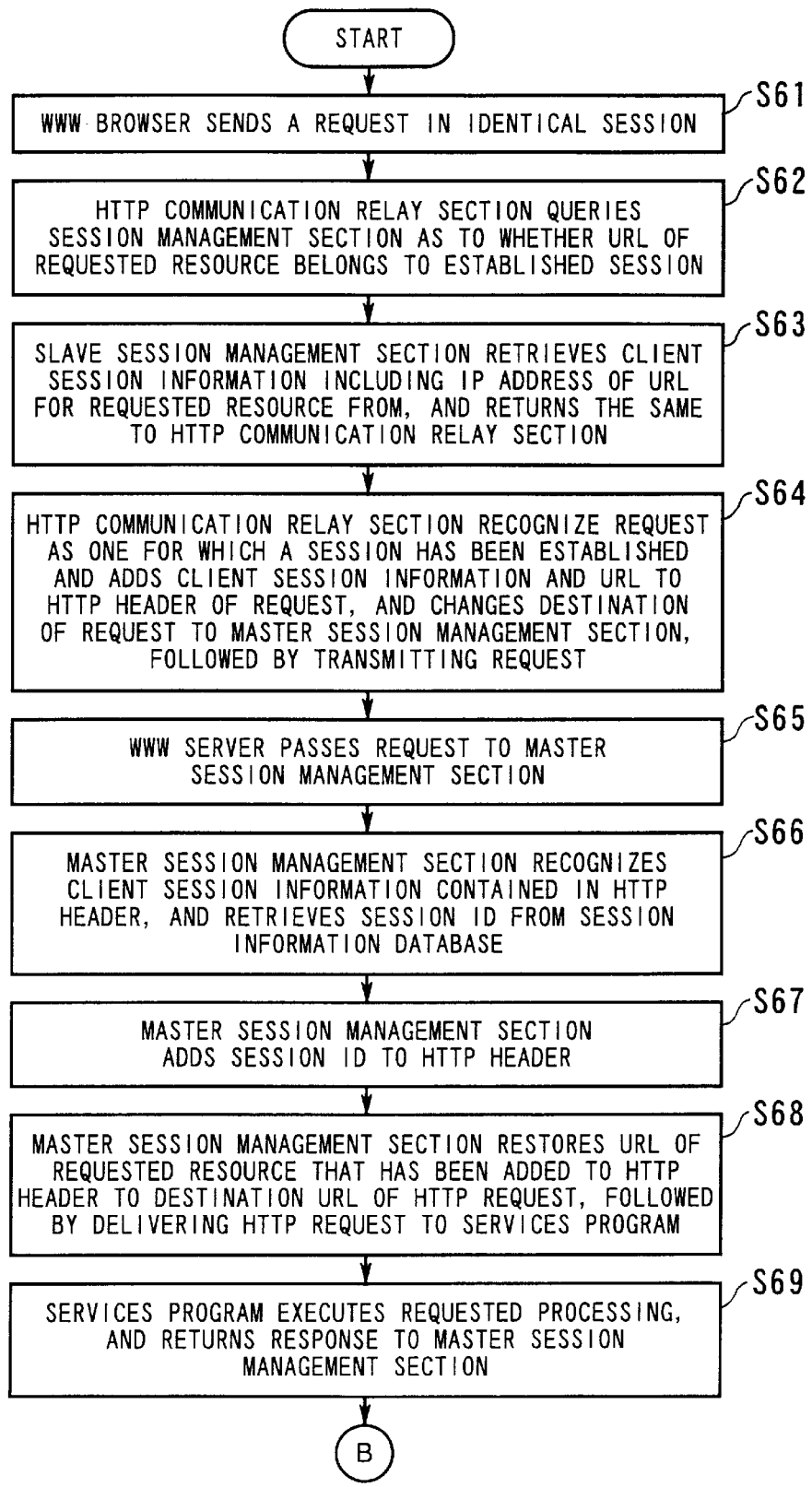
FIG. 11 is a flowchart showing a first half of a routine for processing a request on a session subject to management.

FIG. 11 shows the first half of the routine for processing a request on a session under management.

[S61] The WWW browser 110 sends a request in an identical session (i.e. a request to a WWW server with which a session has been established).

[S62] The HTTP communication relay section 121 queries the session management section 124 as to whether the URL of a requested resource belongs to an established session.

[S63] The session management section 124 retrieves client session information including the IP address of the URL for the requested resource from the client session management database 124a, and returns the same to the HTTP communication relay section 121.

[S64] The HTTP communication relay section 121 recognizes the request as one for which a session has been established and adds the client session information and the URL to the HTTP header of the request, and changes the destination of the request to the session management section 320, followed by transmitting the HTTP request.

[S65] The WWW server 310 passes the request to the session management section 320.

[S66] The session management section 320 recognizes the client session information contained in the HTTP header, and retrieves the session ID containing the client session information from the session information database 321.

[S67] The session management section 320 adds the session ID to the HTTP header.

[S68] The session management section 320 restores the URL of the requested resource that has been added to the HTTP header to the destination URL of the HTTP request, followed by delivering the HTTP request to the services program 330.

[S69] The services program 330 executes the requested processing, and returns a response to the session management section 320. In doing this, the services program 330 recognizes the processing request as one belonging to an established session, using the correspondence between the session ID added to the HTTP header and the session ID stored as data of the program. Further, the session ID of the request is added to the HTTP header of the response.

Figure 12:
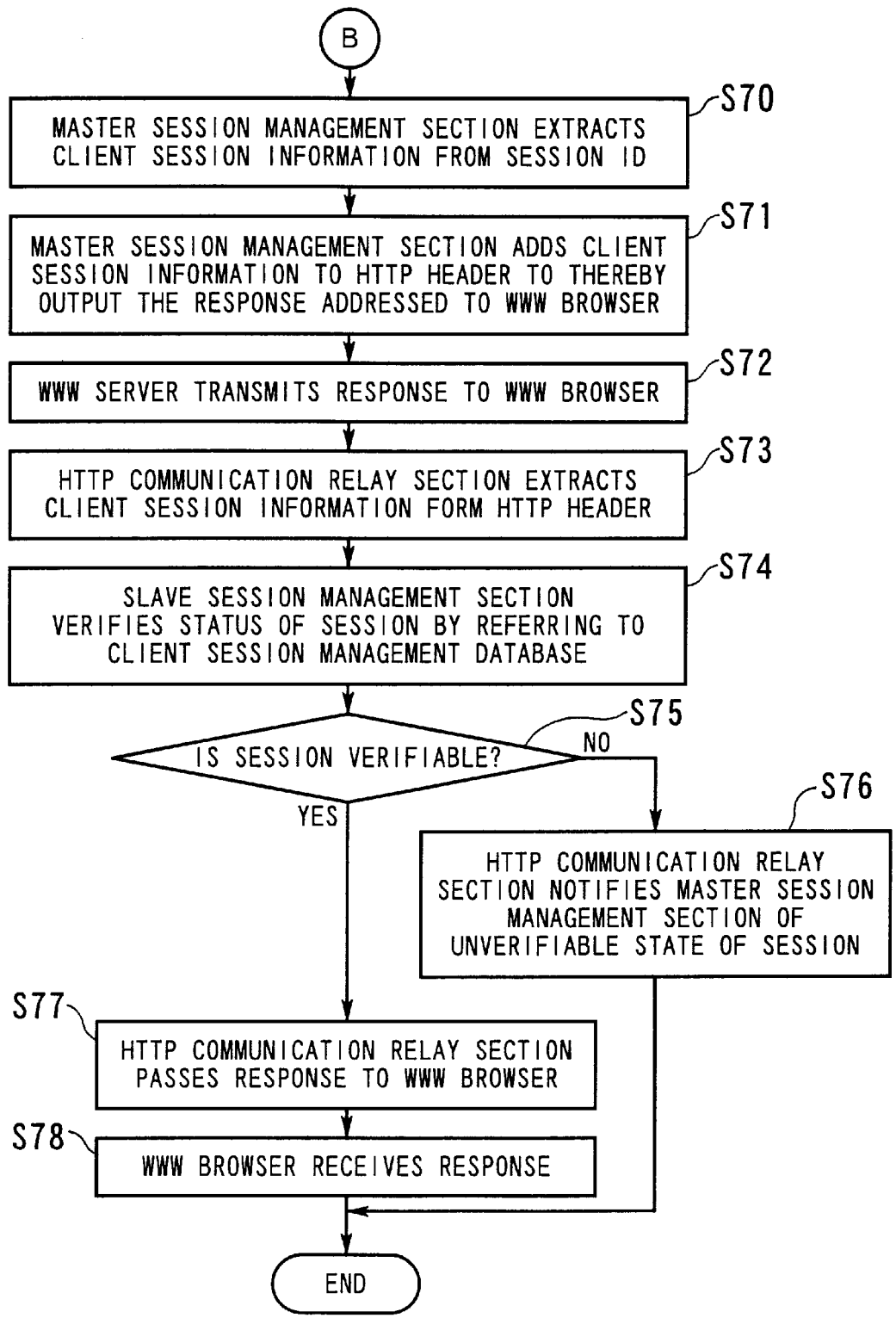
FIG. 12 is a flowchart showing a second half of the FIG. 11 routine.

FIG. 12 shows the second half of the routine for processing the request on the session under management.

[S70] The session management section 320 extracts the client session information from the session ID.

[S71] The session management section 320 adds the client session information to the HTTP header, to thereby output the response addressed to the WWW browser 110.

[S72] The WWW server 310 transmits the response to the WWW browser 110.

[S73] The HTTP communication relay section 121 extracts the client session information from the HTTP header.

[S74] The session management section 124 verifies the status of the session by referring to the client session management database 124a.

[S75] The HTTP communication relay section 121 determines whether or not the session is verifiable. If the session is verifiable, i.e. current, the program proceeds to a step S77, whereas if the session is not verifiable, the program proceeds to a step S76.

[S76] The HTTP communication relay section 121 notifies the session management section 320 of the unverifiable state of the session, followed by terminating the program.

[S77] The HTTP communication relay section 121 passes the response to the WWW browser 110.

[S78] The WWW browser 110 receives the response, followed by terminating the processing.

The above is the processing that is executed on an established session. Next, a routine for terminating session management will be described. Cancellation of a session is executed by the HTTP communication relay section 121 when the system 121 receives a termination request for a specific resource entered in the resource database 121a for session management (i.e. a session management termination request).

Figure 13:
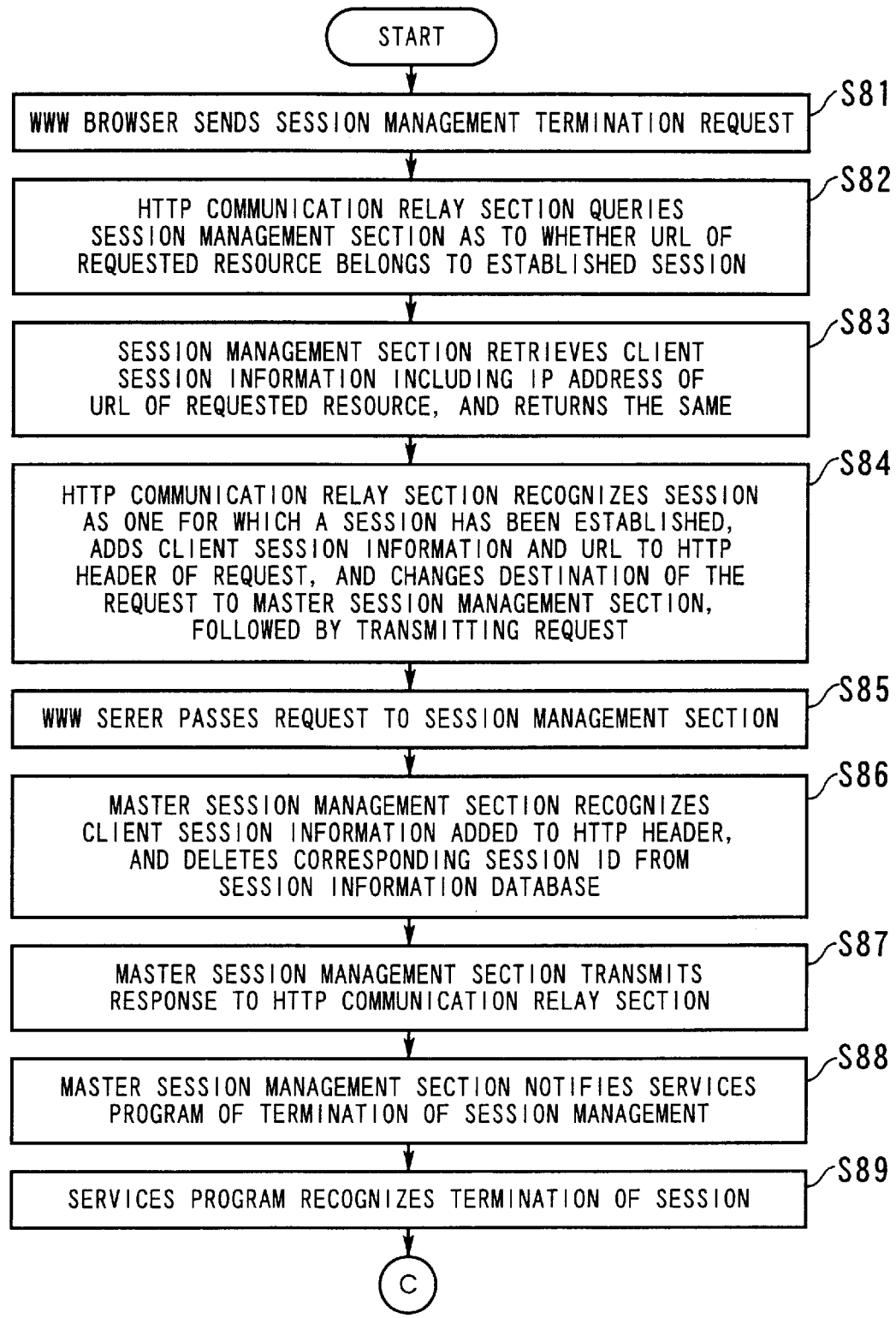
FIG. 13 is a flowchart showing a first half of a routine for terminating session management.

FIG. 13 shows the first half of the routine for terminating session management.

[S81] The WWW browser 110 sends a session management termination request. More specifically, the WWW browser 110 sends a processing request addressed to the program "http://www.host.a.co.jp/cgi-bin/end".

[S82] The HTTP communication relay section 121 queries the session management section 124 as to whether the URL of a requested resource belongs to an established session.

[S83] The session management section 124 retrieves a client session information including the IP address of the URL of the requested resource, and returns the same to the HTTP communication relay section 121.

[S84] The HTTP communication relay section 121 recognizes the session as one for which a session has been established, adds the client session information and the URL to the HTTP header of the request, and changes the destination of the request to the session management section 320, followed by transmitting the request.

[S85] The WWW server 310 passes the request to the session management section 320.

[S86] The session management section 320 recognizes the client session information added to the HTTP header, and deletes the corresponding session ID from the session information database 321.

[S87] The session management section 320 prepares and sends a response to the HTTP communication relay section 121.

[S88] The session management section 320 notifies the services program 330 of termination of management of the session.

[S89] The services program 330 recognizes termination of the session, and then deletes the session ID stored as data of its own.

Figure 14:
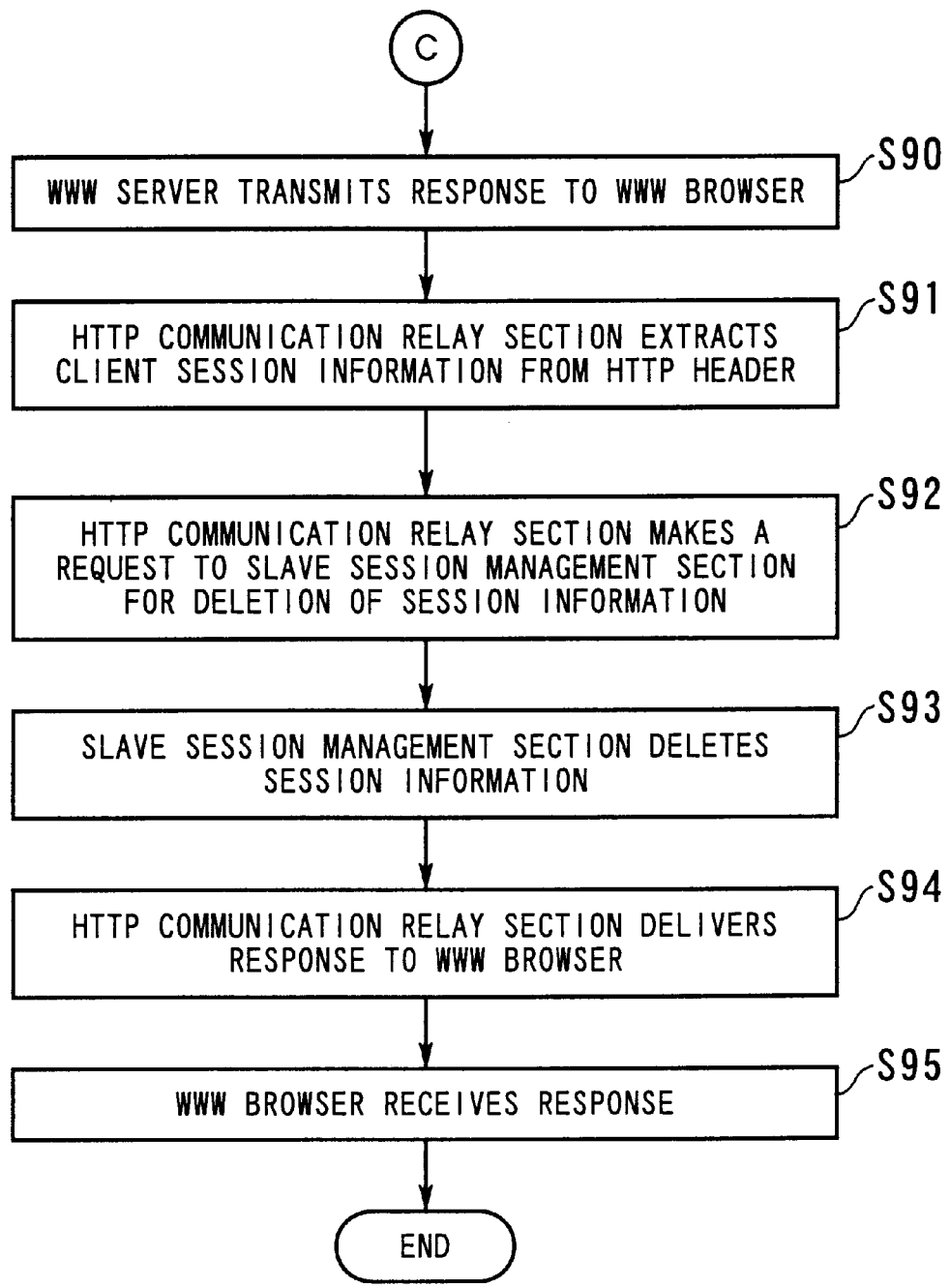
FIG. 14 is a flowchart showing a second half of the FIG. 13 routine.

FIG. 14 shows the second half of the routine for terminating session management.

[S90] The WWW server 310 transmits the response to the WWW browser 110.

[S91] The HTTP communication relay section 121 extracts the client session information from the HTTP header.

[S92] The HTTP communication relay section 121 makes a request to the session management section 124 for deletion of the session information.

[S93] The session management section 124 deletes the session information.

[S94] The HTTP communication relay section 121 delivers the response to the WWW browser 110.

[S95] The WWW browser 110 receives the response, followed by terminating the program.

The processing for canceling a session is executed as described above.

If the above processing is carried out between a client system and a server system, it is possible to carry out the same processing as is effected in conventional client-server systems, by using HTTP. This means that a continuous session can be established by the use of functions common to the WWW browsers and WWW servers that are currently in worldwide use.

A conventional WWW browser is not capable of selecting a proxy server in a manner dependent on a specific WWW server associated with the proxy server. However, the use of the local proxy server 120 on the client system 100 makes it possible to set a different proxy server for each WWW server. An example is shown below.

Figure 15:
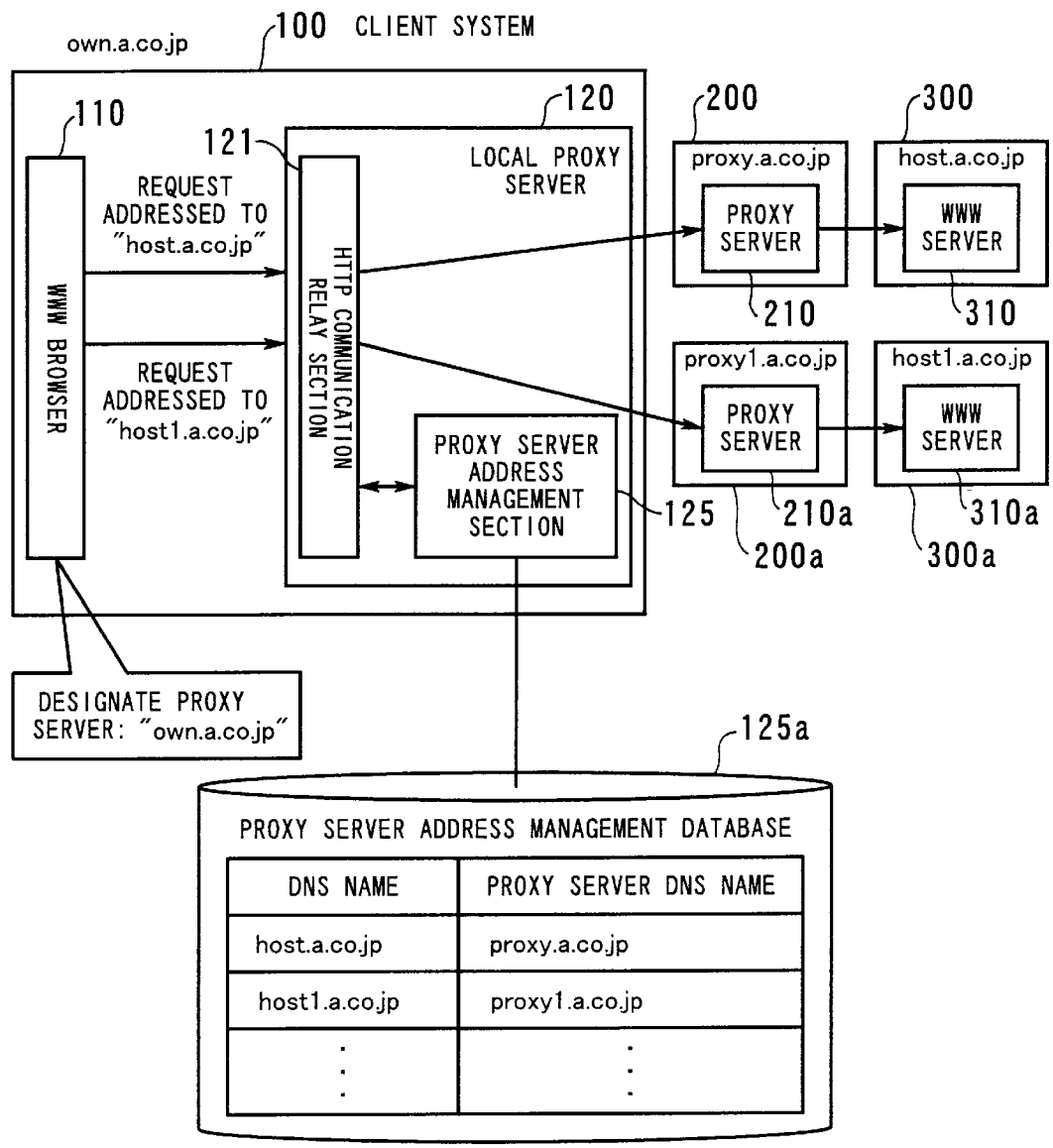
FIG. 15 is a diagram showing a system configuration for managing a plurality of proxy servers.

FIG. 15 shows a system configuration for managing a plurality of proxy servers. In the example, different server systems 200, 200a have respective proxy servers 210, 210a provided thereon. Further, server systems 300, 300a have respective WWW servers 300, 300a provided thereon.

The local proxy server 120 is provided with a proxy server address management section 125 for managing the proxy servers 210, 210a. The proxy server address management section 125 includes a proxy server address management database 125a. The proxy server address management database 125a has DNS names for the proxy servers 210, 210a registered therewith in a manner correlated to the respective DNS names of the WWW servers 310, 310a to which the WWW browser 110 transmits requests via the proxy servers 210, 210a. In this example, a request to the WWW server 310 having a DNS name "host.a.co.jp" is transferred by the proxy server 210 having a DNS name "proxy.a.co.jp", while a request to the WWW server 310a having a DNS name "host1.a.co.jp" is transferred by the proxy server 210a having a DNS name "proxy1.a.co.jp".

Further, the WWW browser 110 specifies the DNS name ("own.a.co.jp") of the client system 100 itself to designate a proxy server.

Each time the HTTP communication relay section 121 receives a request from the WWW browser 110, it extracts the address (DNS name or IP address) of a WWW server to which the request is addressed from the URL of the requested resource. Then, the HTTP communication relay section 121 queries the proxy server address management section 125 as to which proxy server corresponds to the extracted destination address. The proxy server address management section 125 retrieves the address of the proxy server corresponding to the given destination address from the proxy server address management database 125a and returns the same to the HTTP communication relay section 121. The HTTP communication relay section 121 uses the address of the proxy server returned from the proxy server address management section 125 to transmit the request.

Thus, selection of the proxy server, which corresponds to a specific WWW server, can be carried out. It should be noted that although the proxy server address management database 125a can be configured manually by a user e.g. through the WWW browser 110, it is also possible to change the contents thereof dynamically based on information distributed by a proxy server address distribution section provided on any one of computers on the WWW system.

Figure 16:
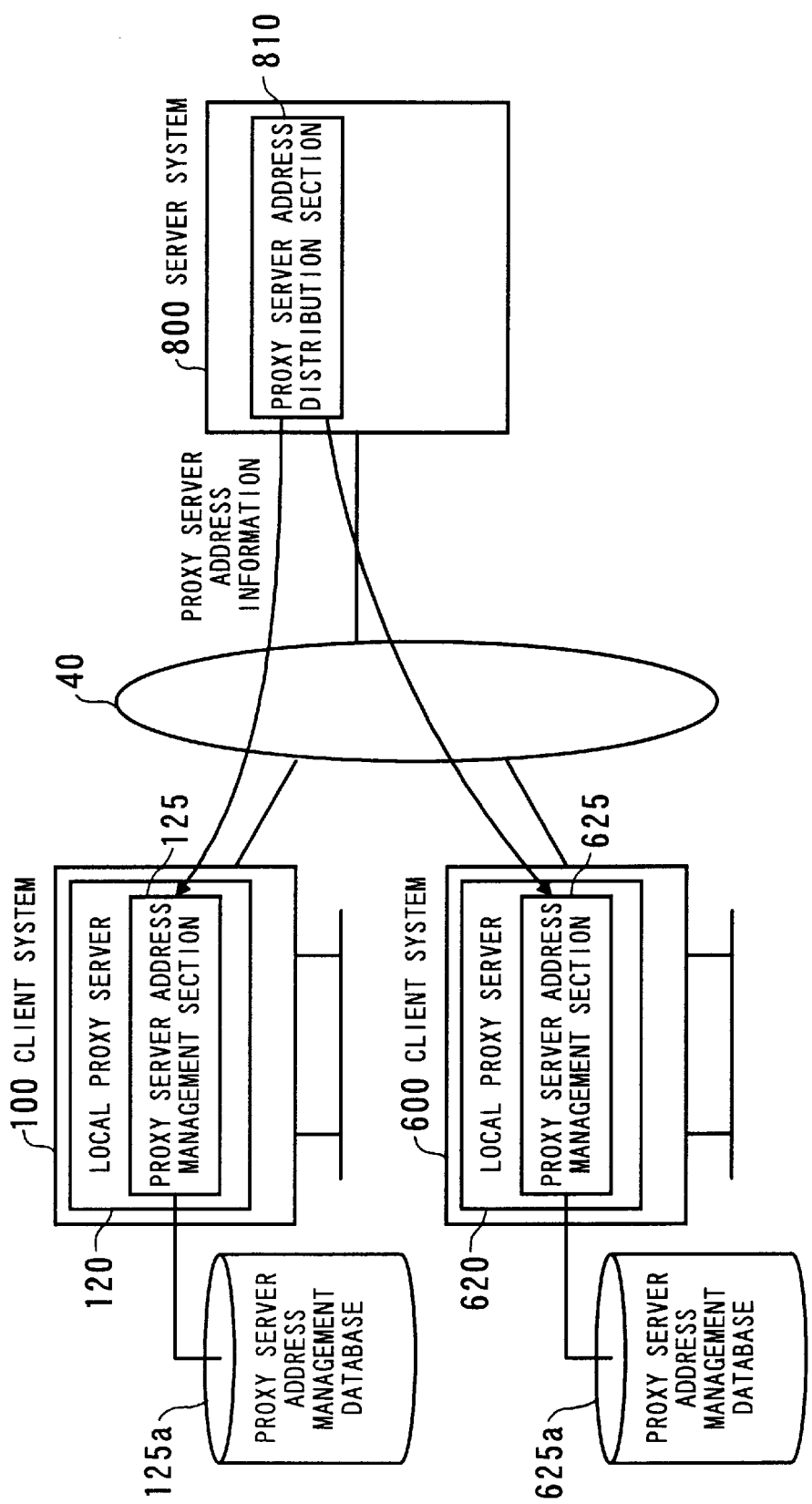
FIG. 16 is a diagram showing a system configuration for dynamically changing designation of a proxy server.

FIG. 16 shows a system configuration for dynamically changing the designation of a proxy server. As shown in the figure, a LAN 40 has client systems 100, 600 connected thereto. Each of the client systems 100, 600 has local proxy servers 120, 620 thereon which includes proxy server address management sections 125, 625 respectively. Further, the proxy server address management sections 125, 625 have proxy server address management databases 125a, 625a respectively.

A server system 800 is connected to the LAN 40. The server system 800 includes a proxy server address distribution section 810. The proxy server address distribution section 810 distributes proxy server address information to the proxy server address management sections 125, 625 on the client system 100, 600 on which designated WWW browsers are operating, according to a command issued by the server system 800. HTTP is used as the protocol for use in distribution of the information.

In order to receive a message of the proxy server address information distributed from the proxy server address distribution section 810 over HTTP, the proxy server address management sections 125, 625 send requests for the establishment of a TCP/IP session in queue for acceptance by the use of a specific port number. When each of the proxy server address management sections 125, 625 has received a distribution message, it adds proxy server address information contained in the distribution message to the proxy server address management databases 125a, 625a respectively.

Thus, in the case of an intra-company LAN (intranet) having a large number of client systems connected thereto, settings concerning the designation of proxy servers within the respective client systems can be changed via the proxy server address distribution section 810. As a result, the workload of the system administrators is reduced. This effect is increased as the network becomes larger.

Further, even when a failure occurs in a proxy server in use, it is possible to set another proxy server immediately for WWW browsers to designate. That is, this configuration enables timely replacement of proxy servers.

Moreover, designation of a proxy server carried out within each client system is managed by a proxy server address management section, and the management by the proxy server address management section can be changed by the proxy server address distribution section 810. Therefore, even if the LAN contains a plurality of kinds of WWW browsers each using a different method for setting a proxy server's address, the proxy server address distribution section 810 can collectively change the settings for the WWW servers.

When there exist a plurality of proxy servers via any one of which a request to a specific WWW server can be routed, it is possible to carry out load distribution among the proxy servers. Therefore, it can be contemplated that the load distributing capabilities for WWW servers, shown in FIG. 3, are utilized for distributing load among proxy servers.

Figure 17:
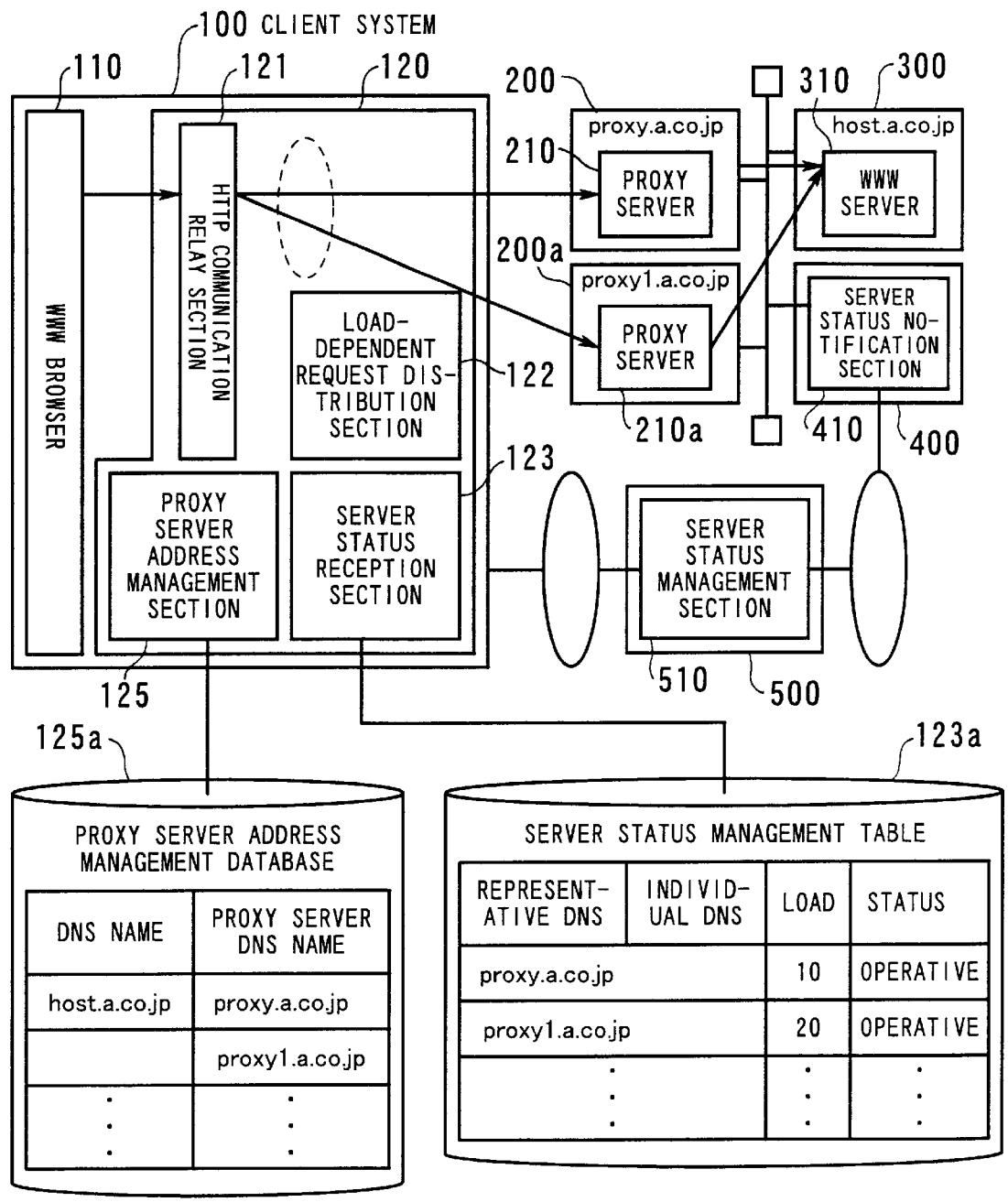
FIG. 17 is a diagram which is useful in explaining a function for distributing load among the proxy servers.

FIG. 17 illustrates load distributing capabilities for proxy servers. Components shown in FIG. 17 not only have the same capabilities as those designated by identical reference numerals in FIGS. 3 and 15 but also include the following capabilities.

The server status notification section 410 notifies the server status management section 510 of the status of each of the proxy servers 210, 210a as well as that of the WWW server 310. The server status management section 510 transfers the notification of the status of each server delivered by the server status notification section 410 to the server status reception section 123 running on the client system 100. The server status reception section 123 registers the status of each server and the status of each of the proxy servers 210, 210a with the server status management table 123a. The proxy server address management section 125 can correlate the DNS names of a plurality of proxy servers with the DNS name of one WWW server in the proxy server address management database 125a. When the HTTP communication relay section 121 receives a request addressed to a specific WWW server from a WWW browser 110, it demands the proxy server address management section 125 of the DNS name of a proxy server correlated to the specified WWW server. If there are a plurality of correlated proxy servers, the proxy server address management section 125 requests the request distribution section 122 to detect a proxy server which is experiencing the lowest load out of the plurality of available proxy servers. The request distribution section 122 detects the proxy server that is experiencing the lowest load from the server status management table 123a, at the request of the HTTP communication relay section 121, and returns the same to the proxy server address management section 125. The proxy server address management section 125 returns the DNS name of the proxy server selected by the request distribution section 122 to the HTTP communication relay section 121. The HTTP communication relay section 121 then sends the request to the proxy server having the returned DNS address.

The above load distribution processing for proxy servers can be executed simultaneously with the load distribution for WWW servers. The processing will be described in detail below.

Figure 18:
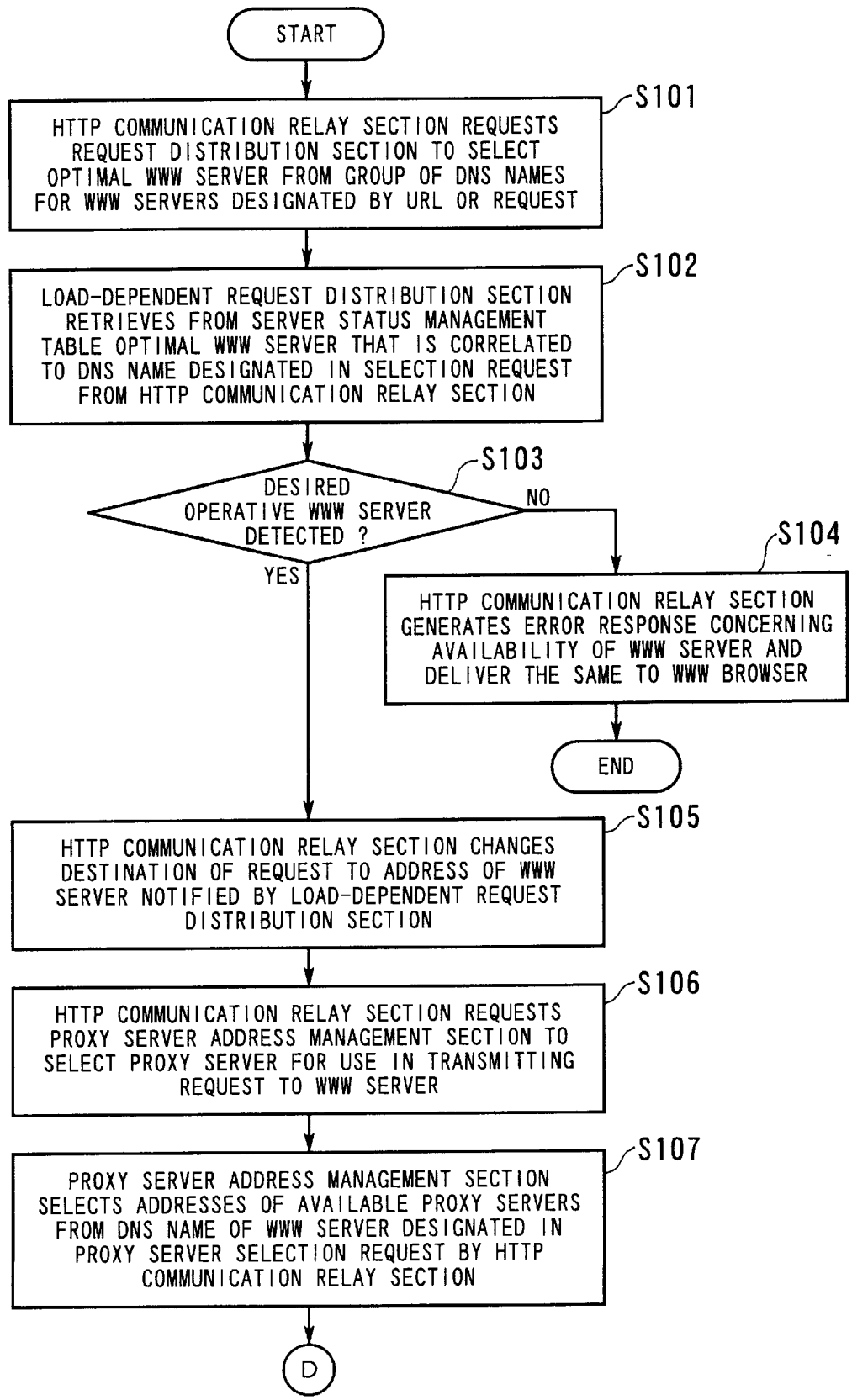
FIG. 18 is a flowchart showing a first half of a routine for carrying out load distribution for WWW servers and load distribution for proxy servers simultaneously.

FIG. 18 shows the first half of a routine for executing load distribution processing for proxy servers and load distribution processing for WWW servers simultaneously. The routine will be described in order of step numbers.

[S101] The HTTP communication relay section 121 requests the request distribution section 122 to select the optimal WWW server from the group of DNS names for the WWW servers designated by the URL of the request.

[S102] The request distribution section 122 retrieves from the server status management table 123a, the optimal WWW server that is correlated to the DNS name designated in the selection request from the HTTP communication relay section 121.

[S103] The request distribution section 122 determines whether a desired operative WWW server has been detected. If such a WWW server has been detected, the program proceeds to a step S105. Otherwise, the program proceeds to a step S104.

[S104] The HTTP communication relay section 121 generates an error response concerning detection of the desired operative WWW server and then delivers the same to the WWW browser 110.

[S105] The HTTP communication relay section 121 changes the destination of the request to the address of the WWW server notified by the request distribution section 122.

[S106] The HTTP communication relay section 121 requests the proxy server address management section 125 to select a proxy server for use in transmitting the request to the WWW server.

[S107] The proxy server address management section 125 selects the addresses of available proxy servers from the DNS name of the WWW server designated in the proxy server selection request by the HTTP communication relay section 121.

Figure 19:
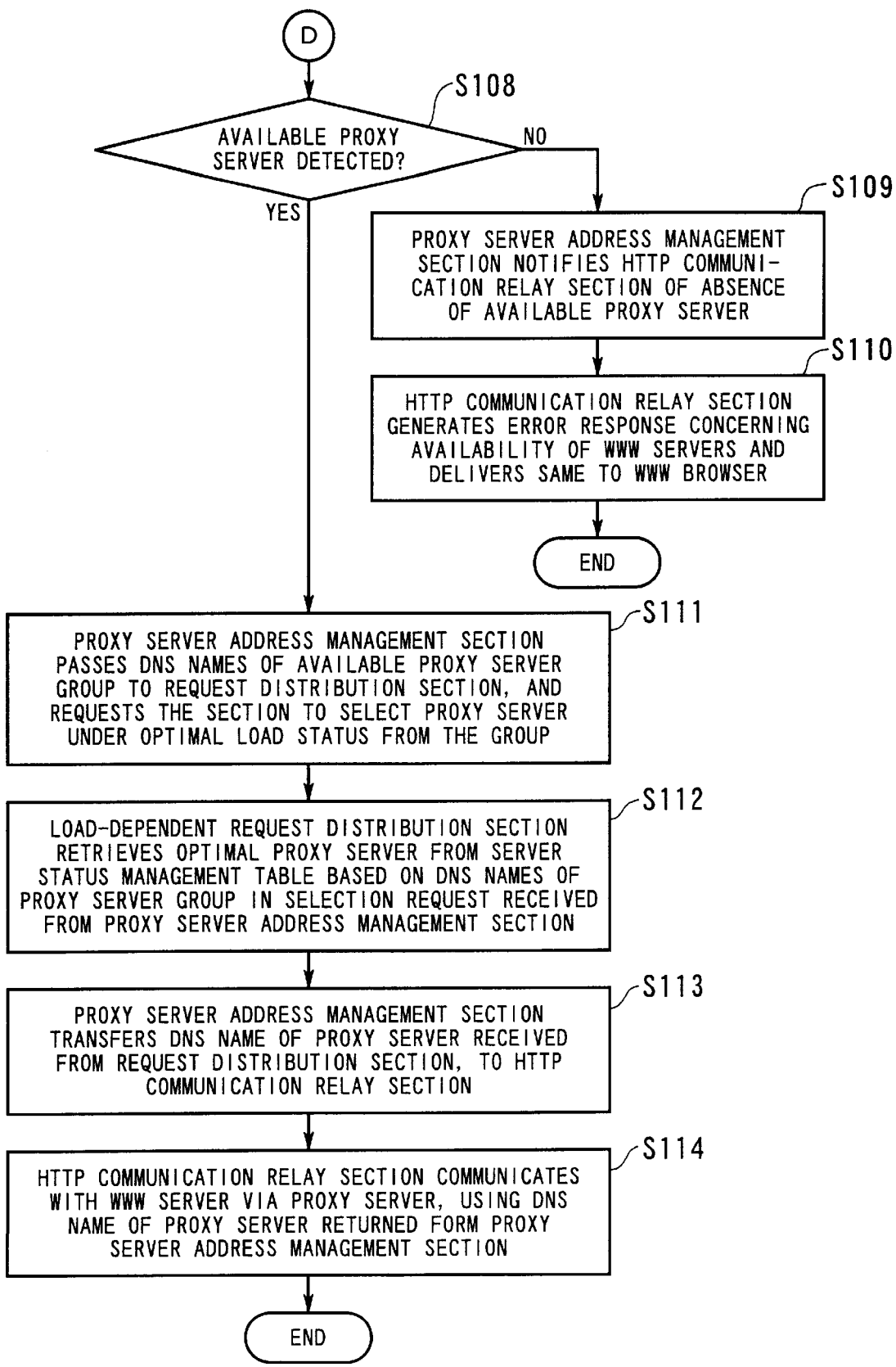
FIG. 19 is a flowchart showing a second half of the FIG. 18 routine.

FIG. 19 shows the second half of the routine for executing load distribution processing for proxy servers and load distribution processing for WWW servers simultaneously.

[S108] The proxy server address management section 125 determines whether or not any available proxy server has been detected. If any proxy server has been detected, the program proceeds to a step S111, whereas if no proxy server has been detected, the program proceeds to a step S109.

[S109] The proxy server address management section 125 notifies the HTTP communication relay section 121 of the absence of an available proxy server.

[S110] The HTTP communication relay section 121 generates an error response concerning availability of WWW servers and delivers the same to the WWW browser.

[S111] The proxy server address management section 125 passes the DNS names of the available proxy server group to the request distribution section 122, and requests the section 122 to select a proxy server under the optimal load status from the group.

[S112] The request distribution section 122 retrieves the optimal proxy server from the server status management table 123a, based on the DNS names of the proxy server group in the selection request received from the proxy server address management section 125, and returns the DNS name of the selected proxy server to the proxy server address management section 125.

[S113] The proxy server address management section 125 transfers the DNS name of the proxy server received from the request distribution section 122, to the HTTP communication relay section 121.

[S114] The HTTP communication relay section 121 then communicates with the WWW server via the proxy server, using the DNS name of the proxy server returned from proxy server address management section 125.

Thus, load on the WWW servers and load on the proxy servers can be distributed simultaneously.

Further, the use of a local proxy server as described above also makes it possible to reliably interpret the character code employed in a document being transferred.

Character codes used in WWW servers on the Internet or the like are not unified. That is, some WWW servers use the EUC (extended Unix code), and other WWW servers use the shift-JIS code. Conventionally, determination of the type of character code in use is automatically carried out by a recognition program.

However, in order to identify a specific code type using the automatic recognition program, a predetermined minimum amount of code data is required. Therefore, the automatic recognition program is only able to determine the type of character code used for a large document. Conversely, it would not be able to determine the type of character code contained in a simple imperative sentence or other data containing less than the required amount of code. To overcome this shortcoming, a local proxy server is provided with an attribute management section for managing character code. An example of one such system is shown in the following example.

Figure 20:
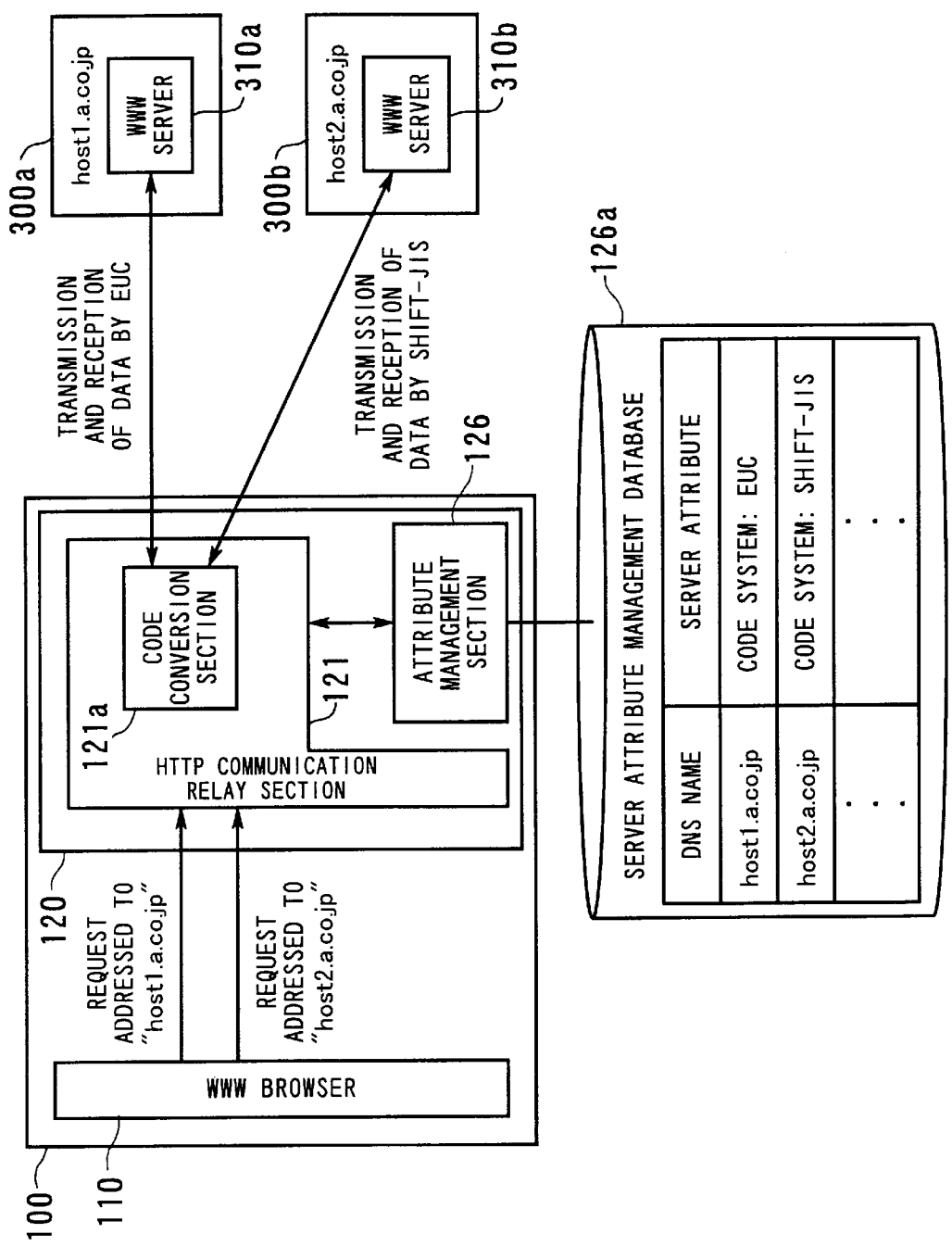
FIG. 20 is a diagram showing a system configuration for executing character code management.

FIG. 20 shows a system configuration for managing character code. The HTTP communication relay section 121 incorporates a code conversion section 121a for managing character code. The code conversion section 121a recognizes a code system employed by the WWW browser 110. The code conversion section 121a converts the character code from information received from a WWW server to the character code in use by the WWW browser 110, and translates the information to be transmitted to a WWW server into the code in use by that WWW server.

Further, the local proxy server 120 is provided with an attribute management section 126. The attribute management section 126a has a server attribute management database 126a, in which server attributes are entered such that each entry is correlated to the DNS name of a WWW server. In this embodiment, each of the server attributes indicates a code system in use by a corresponding server. In the illustrated example, the code system used by the WWW server 310a operating on the server system 300a with the DNS name "host1.a.co.jp" is "EUC", while the code system used by the WWW server 310b operating on the server system 300b with the DNS name "host2.a.co.jp" is "Shift-JIS".

In the system configured as above, when the WWW browser 110 sends a request to a WWW server, the HTTP communication relay section 121 queries the attribute management section 126 as to the code attribute for the WWW server to which the request is addressed. Based on the DNS name of the WWW server, the attribute management section 126 retrieves the code attribute correlated to the DNS name from the server attribute management database 126a, and returns the detected attribute to the HTTP communication relay section 121. In the HTTP communication relay section 121, the code conversion section 121a converts the code of information output by the WWW browser 110 to the code corresponding to the attribute correlated to the WWW server to which the request is to be transmitted. The system then transmits the request to the WWW server.

Similarly, when information is received from a WWW server, the local proxy server 120 determines the code system employed on the WWW server from the DNS name thereof by using the server attribute management database 126a, then converts the code of the information to the code corresponding to the attribute correlated to the WWW browser 110, followed by passing the information to the WWW browser 110.

Thus, this system enables proper code conversion regardless of the amount of data contained in a message.

It should be noted that the above HTTP communication relay section is capable of storing historical information on data that it transfers. This capability makes it possible to analyze the cause of a communication problem, if it should occur. The conventional WWW system has no means for determining whether or not a response from a WWW server has been notified to a WWW browser without any error. However, the conventional client-server system is very often required to check the reception of a response to a client. Further, even if it is not required to check the accurate arrival of a response during normal operation of the system, many of the causes of transmission errors can be identified by checking the arrival of responses. Therefore, utilization of the local proxy server of the present invention which is capable of storing historical information on transferred data makes a check possible to verify the arrival of data from a WWW server when errors occur. Analysis of this data may allow the cause of these errors to be determined.

The processing capabilities described heretofore can be implemented by programs running on computers. More specifically, the processing capabilities which a local proxy server, a server status notification section, a server status management section, a session management section (master or slave), and a proxy server address distribution section should have are written in programs which are stored on a computer-readable recording medium, and the above-described processing capabilities are realized by executing these programs on computers. The computer-readable recording medium may be a magnetic recording medium, semiconductor memory or the like. In order to market these programs, it is possible to store them on transportable recording media such as CD-ROMs (Compact Disk Read Only Memories) and floppy disks for distribution, or store the same on a storage device connected to a computer via a network for transfer to other computers. Each program is executed by storing it e.g. on a hard disk within the computer and loading it into main memory.

As described above, according to the load distribution system of the invention, the request distribution means within a client system obtains information on the load status of available servers from the server status management means to identify the server experiencing the lowest load. Therefore, it is possible to execute appropriate load distribution to prevent the concentration of load at any single location on the network.

Further, according to the session management system of the invention, an established session is managed based on both of client session information generated by the slave session management means and server session information generated by the master session management means, so that servers can determine whether or not processing is required in an identical session, whereby continuous session management can be executed.

Further, according to the client system of the invention, the request distribution means obtains load status information for each server and then the request relay means determines the destination of a processing request to be transferred, which makes it possible to carry out proper load distribution by the means provided within the client system.

Still further, according to the computer-readable recording medium storing a load distribution program according to the invention, it is possible to construct the load distribution system of the invention using a plurality of computers by causing server computers and client computers to execute the stored load distribution program.

Moreover, according to the computer-readable recording medium storing a session management program according to the invention, it is possible to construct the session management system of the invention using a plurality of computers by causing server computers and client computers to execute the stored session management program.

Finally, according to the computer-readable recording medium storing a local proxy server program according to the invention, it is possible to construct a client system according to the invention on a computer by causing the stored local proxy server program to be executed on the computer.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be restored to, falling within the scope of the invention in the appended claims and their equivalents.

What is claimed is:

1. A load distribution system for distributing load among a plurality of servers, comprising:

server status notification means provided for each of said servers, for collecting processing requests sent to said each of said servers, and sending out information on an amount of processing of said each of said servers;

server status management means for obtaining said amount of processing of said each of said servers collected by said server status notification means to manage a load status of said each of said servers; and client systems, each of said client systems having request distribution means which obtains load information on said load status of said each of said servers from said server status management means and is responsive to a sever selection request for determining a destination server to which a processing request should be delivered based on said load information on said load status of said each of said servers, and request relay means which is responsive to a processing request for delivering said server selection request to said request distribution means, and delivers said processing request to said destination server determined by said request distribution means.

2. A load distributing system according to claim 1, wherein said server status notification means also collects status information concerning whether said each of said servers is capable of accepting a processing request, said server status management means obtaining said status information collected by said server status notification means and distributing said load information to said client systems when said status information has changed.

3. A load distribution system according to claim 1, wherein said server status management means is responsive to a load information distribution request for distributing said load information to one of said client systems which has delivered said load information distribution request, said request distribution means delivering said load information distribution request to said server status management means to thereby obtain said load information concerning said each of said severs from said server status management means, when said server selection request is received.

4. A load distribution system according to claim 1, wherein said sever status management means distributes said load information to said client systems at intervals of a predetermined time period.

5. A load distribution system according to claim 1, wherein said server status management means is responsive to a status setting command in which a load status of a designated one of said servers is designated, for fixedly setting said load status of said designated one of said servers to a designated value.

6. A load distribution system according to claim 1, further including agent server selection means which manages correlation between said servers and agent servers each relaying a processing request addressed to a corresponding one of said servers, and is responsive to an agent server selection request concerning a processing request addressed to a designated server, for selecting one of said agent servers which is correlated to said designated server, said request relay means delivering said agent server selection request to said agent server selection means when said processing request is received, and delivering said processing request to said one of said agent servers determined by said agent server selection means.

7. A load distribution system according to claim 6, wherein said server status notification means monitors a status of a corresponding one of said agent servers, said agent server selection means delivering said server selection request to said request distribution means when said designated server defined in said agent server selection request corresponds to a plurality of agent servers, and selecting one of said agent servers determined by said request distribution means.

8. A session management system that carries out session management based on a communication protocol in which one cycle of communication between a client and a server is completed by one request from said client and one response from said server to said one request, the session management system comprising:
- a client system, said client system having slave session management means which generates client session information when processing subject to said session management is started to thereby deliver said client session information, and delivers said client session information generated when said processing subject to said session management was started, for a processing request on an established session, and communications relay means which receives said client session information from said slave session management means when a processing request for said processing subject to said session management is received, and adds said client session information to said processing request for said processing subject to said session management to deliver the resulting processing request; and
- a server system, said server system having master session management means for storing session IDs each comprising a pair of client session information and server session information, said master session management means generating server session information when a processing request containing added client session information which has not yet been stored by said master session management means is received, to thereby store a new session ID comprising said added client information and said generated server session information, and at the same time adding said new session ID to said processing request received to deliver the resulting processing request to a destination thereof, while when a processing request containing client session information which has already been stored by said master session management means is received, said master session management means adding one of said session IDs stored thereby which corresponds to said client session information contained in said processing request to said processing request received to thereby deliver the resulting processing request to a destination thereof.

9. A session management system according to claim 8, wherein said communication relay means stores information on server resources subject to said session management, and when a processing request is addressed to any of said server resources, said communication relay means recognizes said processing request as one for prooccessing subject to said session management.

10. A client system connected via a network to a server system having server status management means for managing a load status of each of a plurality of servers through managing information on a count of processing requests addressed to said each of said servers, the client system comprising:
- request distribution means which obtains load information on said load status of said each of said servers from said server status management means and determines a destination server to which a processing request should be delivered based on said load information on said load status of said each of said servers when a sever selection request is received; and
- request relay means which delivers said server selection request to said request distribution means when a processing request is received, and delivers said processing request to said destination server determined by said request distribution means.

11. A client system for delivering a processing request to a server via an agent server, the client system comprising:
- agent server selection means which manages correlation between servers and agent servers, and selects one of said agent servers which is correlated to a server designated in a processing request, when said agent server selection means receives an agent server selection request requesting said agent server selection means to select an agent server to which said processing request should be relayed; and
- request relay means which delivers said agent server selection request to said agent server selection means when said processing request is received, and delivers said processing request to said one of said agent servers selected by said agent server selection means.

12. A client system for transmitting and receiving information through conversion of a code of characters used for said information, the client system comprising:
- attribute management means which manages correlation between servers and code systems employed in said servers, and determines one of said code systems which is correlated to a server designated in a code system determination request in which said server as a destination is designated; and
- request relay means which delivers said code system determination request to said attribute management means when a request for relaying communication is received, and when information is received, said request relay means converting said received information from said code system determined by said attribute management means into a code system employed by said client system, while when information is transmitted, said request relay means converts said information for said transmission from said code system employed by said client system into said code system determined by said attribute management means.

13. A computer-readable recording medium storing a load distribution program for distributing load among a plurality of servers, said load distribution program comprising:
- causing a first server computer to function as sever status notification means to be provided for each of said servers, for collecting processing requests sent to said each of said servers, and sending out information on an amount of processing of said each of said servers;
- causing a second server computer to function as server status management means for obtaining said amount of processing of said each of said servers collected by said server status notification means to manage a load status of said each of said servers; and
- causing a client computer to function as request distribution means which obtains load information on said load status of said each of said servers from said server status management means and is responsive to a sever selection request for determining a destination server to which a processing request should be delivered based on said load information on said load status of said each of said servers, and as request relay means which is responsive to a processing request for delivering said server selection request to said request distribution means, and delivers said processing request to said destination server determined by said request distribution means.

14. A computer-readable recording medium storing a session management program for carrying out session management based on a communication protocol in which one cycle of communication between a client and a server is completed by one request from said client and one response from said server to said one request, the session management program comprising:

causing a client computer to function as slave session management means which generates client session information when processing subject to said session management is started, to deliver said client session information, and delivers said client session information generated when said processing subject to said session management was started, for a processing request on an established session, and as communications relay means which receives said client session information from said slave session management means when a processing request for said processing subject to said session management is received, and adds said client session information to said processing request for said processing subject to said session management to deliver the resulting processing request; and causing a server computer to function as master session management means for storing session IDs each comprising a pair of client session information and server session information, said master session management means generating server session information when a processing request containing added client session information which has not yet been stored by said master session management means is received, to thereby store a new session ID comprising said added client information and said generated server session information, and at the same time adding said new session ID to said processing request received to deliver the resulting processing request to a destination thereof, while when a processing request containing client session information which has already been held by said master session management means is received, said master session management means adding one of said session IDs stored thereby which corresponds to said client session information contained in said processing request to said processing request received to thereby deliver the resulting processing request to a destination thereof.

15. A computer-readable medium storing a local agent server program to be executed on a computer which is connected via a network to a server system having server status management means for managing a load status of each of a plurality of servers through managing information on a count of processing requests addressed to said each of said servers, the local agent server program comprising causing said computer to function as:

request distribution means which obtains load information on said load status of said each of said servers from said server status management means and determines a destination server to which a processing request should be delivered based on said load information on said load status of said each of said servers when a sever selection request is received; and request relay means which delivers said server selection request to said request distribution means when a processing request is received, and delivers said processing request to said destination server determined by said request distribution means.

16. A computer-readable medium storing a local agent server program for relaying a processing request to a server via an agent server, the local agent server program comprising causing a computer to function as:

agent server selection means which manages correlation between servers and agent servers, and selects one of said agent servers which is correlated to a server designated in a processing request, when said agent server selection means receives an agent server selection request requesting said agent server selection means to select an agent server to which said processing request should be relayed; and request relay means which delivers said agent server selection request to said agent server selection means when said processing request is received, and delivers said processing request to said one of said agent servers selected by said agent server selection means.

17. A computer-readable medium storing a local agent server program for transmitting and receiving information through conversion of a code of characters used for said information, the local agent server program comprising causing a computer to function as:

attribute management means which manages correlation between servers and code systems employed in said servers, and determines one of said code systems which is correlated to a server designated in a code system determination request in which said server as a destination is designated; and request relay means which delivers said code system determination request to said attribute management means when a request for relaying communication is received, and when information is received, said request relay means converting said received information from said code system determined by said attribute management means into a code system employed by a system of said computer, while when information is transmitted, said request relay means converts said information for said transmission from said code system employed by said system of said computer into said code system determined by said attribute management means.

* * * * *

UNITED STATES PATENT AND TRADEMARK OFFICE
CERTIFICATE OF CORRECTION

PATENT NO.:     6,128,644
DATED      :    October 3, 2000
INVENTOR(S):    Hideki NOZAKI It is certified that errors appear in the above-identified patent and that said Letters Patent is hereby corrected as shown below:

Col. 22,    line 9,  change "sever" to --server--;
            line 35, change "sever" to --server--;
            line 39, change "sever" to --server--.

Col. 24,    line 2,  change "sever" to --server--.
            line 51, change "sever" to --server--.
            line 64, change "sever" to --server--.

Col. 26,    line 7,  change "sever" to --server--.

Signed and Sealed this

Twenty-fourth Day of April, 2001

Attest:

NICHOLAS P. GODICI

Attesting Officer    Acting Director of the United States Patent and Trademark Office